United States Patent [19]
Jordan

[11] Patent Number: 5,585,741
[45] Date of Patent: Dec. 17, 1996

[54] IMPEDANCE EMULATOR

[75] Inventor: Mark Jordan, Goffstown, N.H.

[73] Assignee: Unitrode Corporation, Merrimack, N.H.

[21] Appl. No.: 425,959

[22] Filed: Apr. 19, 1995

Related U.S. Application Data

[63] Continuation-in-part of Ser. No. 231,394, Apr. 22, 1994, abandoned.

[51] Int. Cl.$^6$ .......................... H03K 17/16; H03K 19/0944
[52] U.S. Cl. ................... 326/30; 326/32; 326/86; 333/22 R
[58] Field of Search ........................... 326/30, 21, 31–32, 326/34, 86; 333/22 R, 32; 375/257

[56] References Cited

U.S. PATENT DOCUMENTS

| | | | |
|---|---|---|---|
| 3,937,988 | 2/1976 | DeClue et al. . | |
| 4,109,117 | 8/1978 | Wrench, Jr. | 375/36 |
| 4,386,242 | 5/1983 | Seidel | 179/170 T |
| 4,553,050 | 11/1985 | Feinberg et al. . | |
| 4,595,923 | 6/1986 | McFarland, Jr. | 340/825.52 |
| 4,631,721 | 12/1986 | Ono et al. | 370/85 |
| 4,675,551 | 6/1987 | Stevenson et al. . | |
| 4,707,620 | 11/1987 | Sullivan et al. . | |
| 4,719,369 | 1/1988 | Asano et al. . | |
| 4,748,426 | 5/1988 | Stewart | 333/22 R |
| 4,831,283 | 5/1989 | Newton . | |
| 4,857,002 | 8/1989 | Jensen et al. | 439/76 |
| 4,859,877 | 8/1989 | Cooperman et al. | 326/30 |
| 4,864,291 | 9/1989 | Korpi | 340/825.5 |
| 4,890,271 | 12/1989 | Stohs | 369/24 |
| 4,920,339 | 4/1990 | Friend et al. | 340/825.52 |
| 4,954,089 | 9/1990 | Jensen et al. | 439/76 |
| 5,029,284 | 7/1991 | Feldbaumer et al. . | |
| 5,099,137 | 3/1992 | Lattin, Jr. . | |
| 5,117,331 | 5/1992 | Gebara | 361/407 |
| 5,124,580 | 6/1992 | Matthews et al. | 326/126 |
| 5,136,187 | 8/1992 | Ceccherelli et al. . | |
| 5,159,297 | 10/1992 | Tateno | 333/104 |
| 5,164,663 | 11/1992 | Alcorn | 324/158 R |
| 5,166,561 | 11/1992 | Okura . | |
| 5,208,562 | 5/1993 | Schirm, IV | 333/22 R |
| 5,237,567 | 8/1993 | Nay et al. | 370/85.1 |
| 5,239,559 | 8/1993 | Brach et al. | 375/36 |
| 5,239,658 | 8/1993 | Yamamuro et al. | 395/800 |
| 5,254,883 | 10/1993 | Horowitz et al. . | |
| 5,283,479 | 2/1994 | Rosseel et al. | 326/126 |
| 5,329,184 | 7/1994 | Redfern | 326/543 |
| 5,422,608 | 6/1995 | Levesque | 333/22 R |
| 5,448,081 | 9/1995 | Malhi | 257/77 |

*Primary Examiner*—Edward P. Westin
*Assistant Examiner*—Jon Sartamauro
*Attorney, Agent, or Firm*—Weingarten, Schurgin, Gagnebin & Hayes LLP

[57] ABSTRACT

A low capacitance impedance emulator suitable for active conductor termination. The impedance emulator includes an emulating FET and a control circuit coupled to the gate of the emulating FET for maintaining the FET in a linear region of operation. The control circuit includes a control FET, an impedance setting resistor, and an amplifier. The control FET is driven in a closed-loop fashion so that the impedance of the control FET has a known relationship with respect to that of the resistor. The output of the amplifier controls the conduction of both the emulating and control FETs so that the emulating FET provides an impedance proportional to that of the control FET and thus, related to the impedance of the resistor. A disconnect feature is provided, whereby the impedance emulator is responsive to a disconnect signal for disconnecting the impedance provided by the emulating FET. The impedance provided by the emulating FET is selectable by adjusting the impedance setting resistor or, in one embodiment, the impedance is selectable in response to an impedance selection signal which causes one of a plurality of FETs to operate as the emulating FET. An NMOS FET having features providing enhanced ESD performance is also provided.

33 Claims, 8 Drawing Sheets

IMPEDANCE EMULATOR

RELATED CASE INFORMATION

This case is a continuation-in-part patent application of U.S. patent application Ser. No. 08/231,394, now abandoned entitled: IMPEDANCE EMULATOR, filed Apr. 22, 1994.

FIELD OF THE INVENTION

This invention relates generally to impedance emulation and more particularly, to a low capacitance impedance emulator well suited for active conductor termination.

BACKGROUND OF THE INVENTION

It is well known to terminate a conductor with an impedance which is ideally matched to the dynamic impedance of the conductor in order to reduce signal reflections and concomitant degradation of data transmitted on the conductor. One such terminator comprises a resistor having a resistance value nominally matched to that of the conductor. While the nominal resistance value may match a typical conductor impedance, tolerances can affect the conductor and resistor impedances, thereby degrading the resulting impedance "match". Moreover, the resistance value of such a terminator is fixed so that its use to terminate conductors having different dynamic impedances is precluded.

Another type of terminator utilizes an active device and thus, may be referred to as an active terminator. An example of an active terminator is one utilizing a field effect transistor (FET) biased to saturation. In this operating condition, the FET has a highly non-linear, current source characteristic which generally does not reduce signal reflections as well as terminators having a linear, substantially resistive characteristic.

As is known in the field of bus terminators, only the ends of a communications bus should be terminated with an impedance matched to the impedance of the bus. Bus termination at intermediate points, or nodes along the bus can disadvantageously effect signal integrity. As is also known, the impedance of the bus sought to be matched by a terminator varies in accordance with the length of the bus.

SUMMARY OF THE INVENTION

In accordance with the invention, a low capacitance impedance emulator is provided for emulating a selected impedance having a substantially linear characteristic. The emulator is well suited for use in terminating one or more conductors of a high-speed data bus where accurate, low capacitance termination is critical. the low capacitance of the emulator ensures that when the terminator is coupled to the bus in a disconnect mode, the emulator does not adversely affect the conductor impedance. The impedance emulator utilizes an emulating FET operated in the linear region. The linear operation of the emulating FET provides an impedance across the drain and source electrodes of the FET which is substantially resistive (i.e., characterized by a linear relationship between the current through the FET and the voltage across the FET). This resistive characteristic is particularly effective in signal termination to reduce unwanted signal reflections.

A control circuit is provided for maintaining the emulating FET in the linear region of operation and includes a control FET having like characteristics to the emulating FET and coupled in series with a resistor. The control FET is operated in a closed-loop fashion so that its conduction is controlled to maintain a predetermined voltage thereacross and more particularly, to provide an impedance having a predetermined relationship with respect to the resistance of the resistor. The emulating FET receives the same gate signal as the control FET, thereby causing the emulating FET to provide an impedance proportional to the impedance of the control FET. The resistor may be a trimmable or a variable resistor so that the impedance provided by the control and emulating FETs can be adjusted by trimming or adjusting the value of the resistor accordingly.

In one embodiment, the emulating FET provides the termination impedance of a signal transmission conductor. More particularly, the emulating FET is coupled in series between a voltage regulator and the conductor and the resistance value of the resistor is selected or trimmed to correspond to the dynamic impedance of the conductor.

Use of the impedance emulator in signal bus termination is advantageous due to the linear, highly resistive characteristic of the FET in the linear region of operation. More particularly, this arrangement serves to reduce signal reflections on the conductor, thereby enhancing the effectiveness of the terminator. Moreover, simple adjustment of the termination impedance is achieved by trimming the resistor of the control circuit to ensure that the emulating FET provides an impedance corresponding to the dynamic impedance of the bus.

In accordance with a further aspect of the invention, a disconnect feature is provided, whereby the emulating FET ceases to provide an impedance to the conductor in response to a disconnect signal. In one embodiment, the emulator circuit includes a switch, the position of which is controlled by the logic state of the disconnect signal. More particularly, the switch is adapted for being in a first position in which the gate terminal of the emulating FET is coupled to ground, thereby terminating conduction of the emulating FET, or in a second position in which the gate terminal of the emulating FET is connected to the output terminal of the amplifier. With this arrangement, the impedance emulator can be selectively disabled when the emulator ceases to be associated with an end of the bus. Additionally, when the switch is positioned to disconnect the emulating FET, the voltage regulator is shut off, thereby conserving power during the disconnect mode of operation.

Also provided is a selectable impedance feature, whereby the emulator includes a plurality of emulating FETs of different sizes. A selected one of the plurality of emulating FETs is enabled in response to an impedance selection signal. This arrangement provides an alternative to the variable resistor of the control circuit for adjusting the impedance provided by the emulating FET.

In one embodiment, a combination disconnect and impedance selection circuit is responsive to a single control signal for connecting or disconnecting the emulating FET from the conductor and for selecting one of a plurality of emulating FETs to present a desired impedance to the conductor when the emulating FET is connected to the conductor. More particularly, the common disconnect/impedance selection circuit is responsive to both the logic state and the impedance of the control signal for selecting the desired operating conditions.

Also provided is a temperature compensation circuit which reduces the effect of temperature variations on the impedance of the control circuit resistor. In one embodiment, the control circuit resistor is a thin film resistor. Since thin film resistors have substantially constant resistance over a relatively wide temperature range, the need for the temperature compensation circuit is reduced and, in certain applications, the temperature compensation circuit may even be eliminated.

Also described is an NMOS device for use as the emulating FET having substantially annular shaped gate and drain regions. The source and drain contacts are spaced from the edge of the gate diffusion region. The substantially annular gate and drain regions and the spacing of the source and drain contacts from the gate region enhance the uniformity of the electric field and current distribution of the device, as is advantageous during an ESD event. The NMOS emulating FET is additionally provided with a capacitor between the gate and source electrodes which causes the FET to conduct during an ESD event, thereby absorbing some of the ESD energy. If the voltage continues to rise, then an inherent npn device of the FET begins to break down and clamp the voltage across its collector and emitter terminals to a first predetermined level. If the current exceeds a predetermined value, then the voltage across the collector and emitter terminals of the npn device will begin to exhibit a "snap back" characteristic, whereby the voltage clamps to a lower level than the first predetermined level. This characteristic is desirable in order to absorb large amounts of ESD energy while maintaining a relatively low clamp voltage.

BRIEF DESCRIPTION OF THE DRAWINGS

The foregoing features of this invention, as well as the invention itself, may be more fully understood from the following detailed description of the invention in which.

DESCRIPTION OF THE PREFERRED EMBODIMENT

Figure 1:
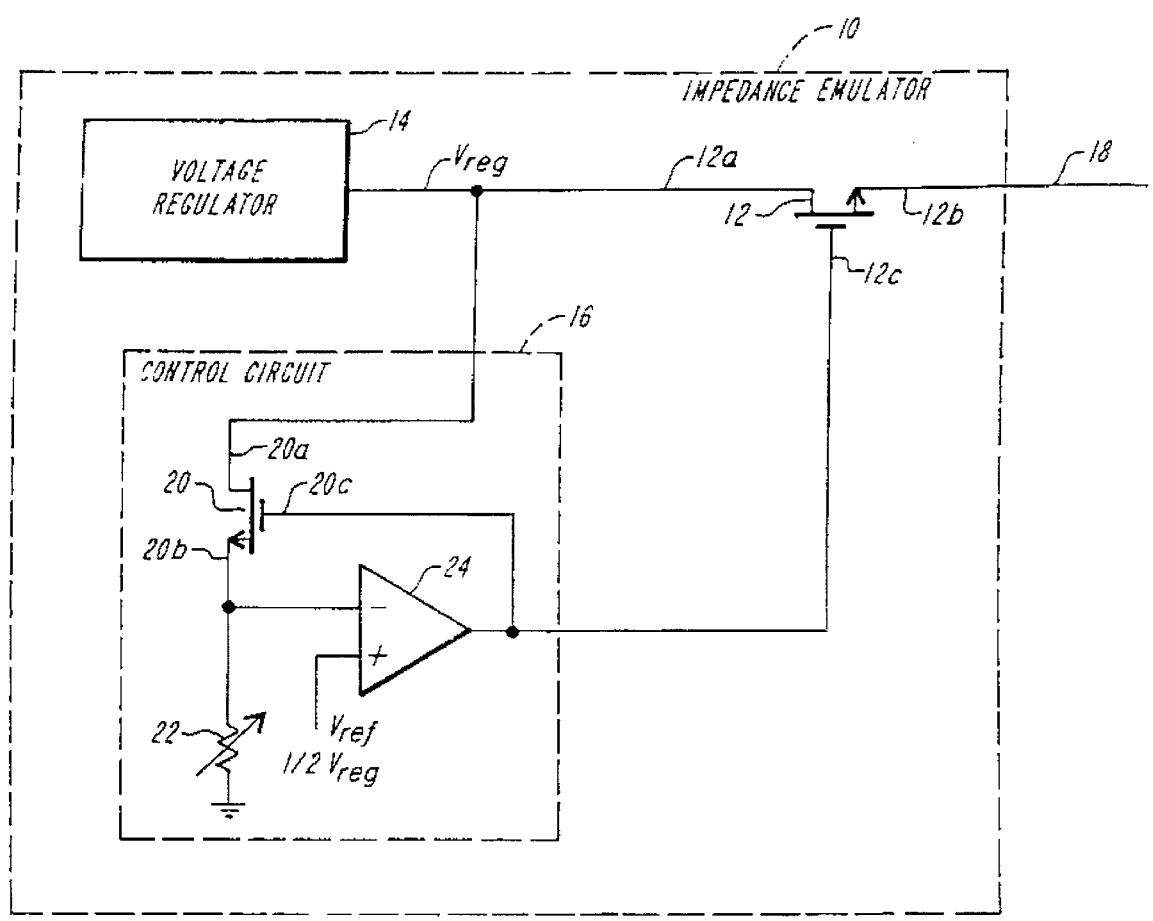
FIG. 1 is a schematic of an impedance emulator in accordance with the present invention.

Referring to FIG. 1, an impedance emulator 10 is shown to include an active emulating device 12 for providing a substantially linear predetermined impedance. The active device 12 is a metal oxide field effect transistor (MOSFET) having a drain electrode 12a, a source electrode 12b, and a gate electrode 12c but alternatively may be any suitable FET. The predetermined impedance is provided across the drain and source electrodes 12a, b of the FET 12 which, in the embodiments described herein is an NMOS FET 12. The impedance emulator 10 further includes a voltage regulator 14 providing a regulated voltage $V_{reg}$ and a control circuit 16 coupled to the gate electrode 12c for controlling the operation of the emulating FET 12. More particularly, the control circuit 16 maintains the FET 12 in its linear region of operation in order to provide the predetermined impedance with a linear, resistive characteristic.

Figure 2:
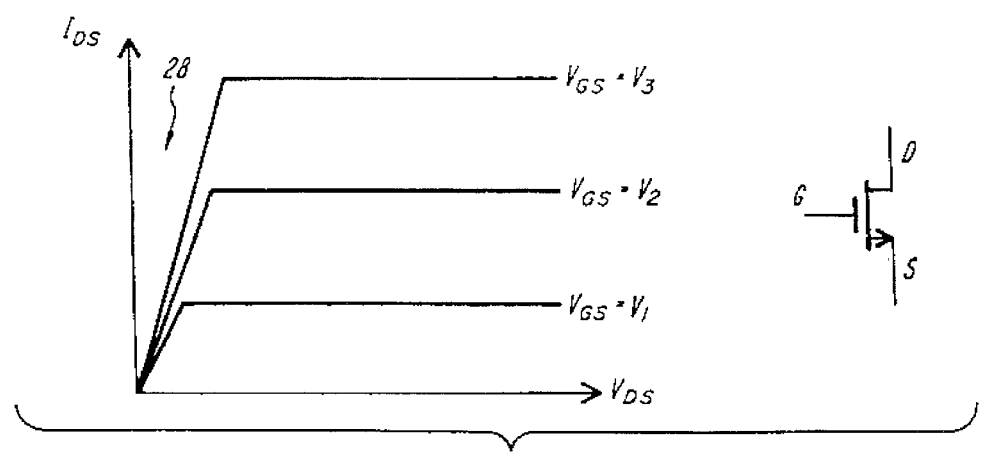
FIG. 2 shows illustrative characteristic curves of an NMOS FET.

Referring also to FIG. 2, illustrative characteristic curves of an NMOS FET, exemplary of the emulating FET 12, are shown to include a linear region of operation labelled 28. The linear region 28 is characterized by a linear relationship between the current $I_{DS}$ between the drain and source electrodes of the FET and the voltage $V_{DS}$ across such electrodes. Operation of the emulating FET 12 in the linear region causes the impedance across the drain and source electrodes 12a,b to approximate that of a resistor. A resistive impedance is particularly advantageous where the impedance emulator is utilized in terminating one or more conductors of a signal transmission bus, such as conductor 18 coupled to the source electrode 12b of the emulating FET 12, in order to reduce unwanted signal reflections. The characteristic curves reveal that the slope of the curves in the linear region (i.e., representative of the drain to source impedance) varies in proportion to the gate to source voltage $V_{GS}$. In order for a FET to be in the linear region, the gate to source voltage $V_{GS}$ must be greater than the sum of the drain to source voltage $V_{DS}$ and the threshold voltage $V_T$ at which the FET begins to conduct (typically 0.7 volts).

The control circuit 16 includes a control FET 20 of the same type as the emulating FET 12 and having a drain electrode 20a, a source electrode 20b, and a gate electrode 20c, a resistor 22 and an operational amplifier 24. The control FET 20 has like characteristics to the emulating FET 12 so that the ratio of the impedance of the two FETs 12, 20 is equal to the ratio of the gate width to gate length of FET 12 to the gate width to gate length of FET 20. The emulating and control FETs 12, 20, respectively, may be identical in size or alternatively, may be scaled in size relative to one another. Preferably FETs 12, 20 are NMOS devices. While PMOS devices may be alternatively utilized, use of NMOS FETs provide certain advantages, including smaller size which equates to lower capacitance. An additional advantage of utilizing an NMOS emulating FET 12 is the electrostatic discharge protection provided by the inherent diode from the source electrode 12b to ground.

The control FET 20 is operated in a closed-loop fashion so that the impedance of the control FET 20 has a known relationship with respect to that of the series coupled resistor 22. Moreover, the emulating FET 12 is controlled by the same control signal as the control FET 20 so that the emulating FET 12 provides an impedance proportional to the impedance of the control FET 20. More particularly, the impedance of the emulating FET 12 is directly proportional to the impedance of the control FET 20 at a nominal operating point (i.e., corresponding to a gate voltage midway between the expected voltage swing at the source electrode 12b of the emulating FET 12). With sufficient gate voltage, the second order effect (i.e., nonlinearity) in the proportionality of the impedance of the emulating FET 12 to that of the control FET 20 is minimized. The impedance of the emulating FET 12 is thus also related to that of the resistor 22 and can be adjusted by varying the resistance of resistor 22.

The resistor 22 may be a trimmable integrated circuit resistor, such as a polysilicon resistor. With this arrangement, the resistor 22 is trimmed to ensure the desired impedance is provided by emulating FET 12. More generally, the resistor 22 is a variable resistor having an adjustable resistance value to facilitate adjustment of the predetermined impedance of the emulating FET 12. In some applications, a fixed precision resistor may provide suitable control of the impedance of the emulating FET 12.

The operational amplifier 24 of the control circuit 16 has an output terminal coupled to the gate electrode 20c of the control FET 20 and the gate electrode 12c of the emulating FET 12. One input of the amplifier 24 is coupled to a reference voltage $V_{ref}$ and another input of the amplifier 24 is coupled to the interconnection between the source electrode 20b of the control FET 20 and the series coupled resistor 22, as shown. The reference voltage $V_{ref}$ has a predetermined relationship with respect to the regulated voltage $V_{reg}$ across the series combination of the control FET 20 and the resistor 22. Here, the reference voltage is equal to ½ $V_{reg}$ since this voltage corresponds to the nominal operating point of midway between the permissible voltage swing on conductor 18 (i.e., such permissible voltage swing being from $V_{reg}$ to ground). More generally however, the reference voltage may be other fractional values of the voltage $V_{reg}$ across the series combination.

With this arrangement, the voltage at the source electrode 20b of the control FET 20 is forced to equal the reference voltage $V_{ref}$=½ $V_{reg}$. Since the drain electrode 20a of the control FET 20 is coupled to the regulated voltage $V_{reg}$, the voltage across the drain and source electrodes 20a,b of the control FET 20 is equal to ½ $V_{reg}$ (i.e., the same voltage as appears across the variable resistor 22). Thus, since the current through the FET 20 and resistor 22 is also equal, the impedance across the control FET 20 is equal to the resistance of resistor 22.

Since the emulating FET 12 is controlled by the same amplifier output signal as the control FET 20, the emulating FET 12 provides an impedance proportional to the impedance of the control FET 20 and thus also, proportional to the resistance of resistor 22. More particularly, if FETs 12, 20 are identical in size, then the impedance of the emulating FET 12 is equal to that of the control FET 20 which, in turn, is equal to the resistance of resistor 22. More generally however, if the control FET 20 is scaled in size relative to the emulating FET 12 so that FET$_{12}$=XFET$_{20}$, then the respective impedances are scaled by the same factor X such that the impedance of FET 12 is equal to the impedance of FET 20 divided by the scale factor X.

In order to ensure that the emulating and control FETs 12, 20, respectfully, are maintained in their respective linear regions of operation, the ratio of the gate width "W" to the gate length "L" of each such FET meets the following criteria:

$$\frac{W}{L} < \frac{I_D}{K_{p(max)} \cdot 0.5 \cdot V_{DS(max)}^2} \quad (1)$$

where $I_D$ is the FET drain current, $K_p$ is a constant associated with the FET equal to the product of the surface mobility and the oxide capacitance, and $V_{DS}$ is the voltage across the drain and source electrodes of the respective FET. Compliance with the FET gate size relationship of equation (1) ensures that the gate voltage $V_{GS}$ remains a threshold voltage above the maximum drain to source voltage $V_{DS}$.

AS noted above, with sufficient gate voltage, the second order effect on the relationship between the impedances of the emulating FET 12 and the control FET 20, such as is caused by variations in the voltage at the source electrode 12b of the emulating FET 12, is minimized. More particularly, the drain to source resistance of emulating FET 12 is given as follows:

$$R_{12} = \frac{1 + \theta \cdot V_{GS}}{K_p \cdot (V_{GS} - V_T) \cdot \left(\frac{W_{12}}{L_{12}}\right)} \quad (2)$$

where θ is a mobility degradation constant. It follows from equation (2) that the change in the resistance of FET 12 with changes in $V_{GS}$ is given by:

$$\frac{\partial R_{12}}{\partial V_{GS}} \alpha \frac{1}{V_{GS}} \quad (3)$$

Equation (3) reveals that as $V_{GS}$ increases, the change in resistance of emulating FET 12 decreases, as is desirable to reduce the second order effect. Stated differently, the higher the gate voltage, the less significant the effect of voltage variations at the source electrode 12b of the emulating FET 12 on the proportionality between the resistance of the emulating FET 12 and the control FET 20.

As is apparent from the above discussion, the impedance of the emulating FET 12 is a function of the resistance of resistor 22, the size scale factor X between the emulating and control FETs, and the relationship between the reference voltage $V_{ref}$ and the regulated voltage $V_{reg}$. By utilizing a trimmable or variable resistor for the resistor 22, the impedance provided by the emulating FET 12 can be readily adjusted as desired for a particular application.

Figure 3:
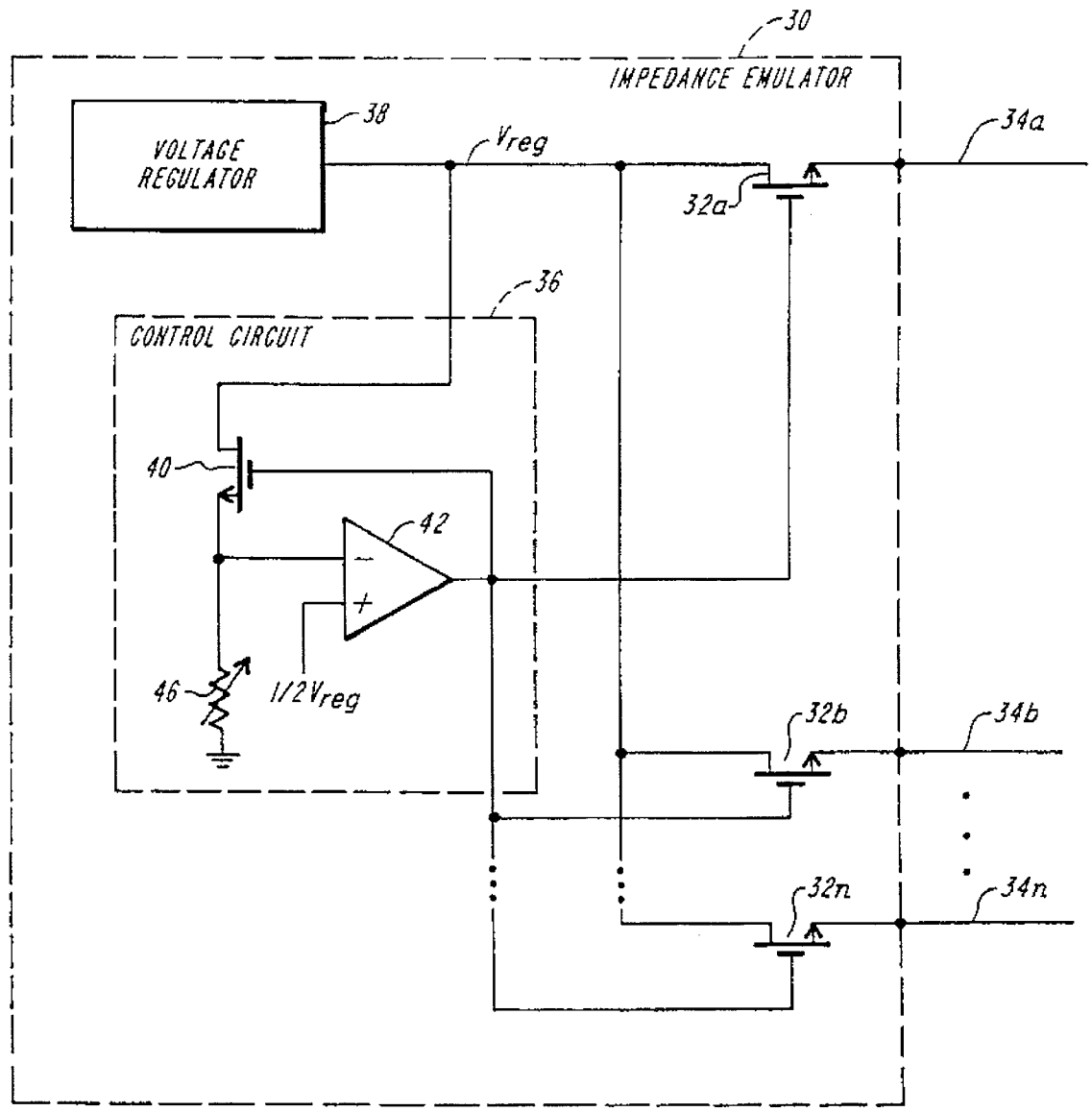
FIG. 3 is a schematic of an active bus terminator utilizing the impedance emulator of FIG. 1.

Referring also to FIG. 3, a further embodiment of the impedance emulator 30 is shown to include a plurality of emulating FETs 32a–n. The impedance emulator 30 is adapted for actively terminating a plurality of conductors 34a–n, such as the conductors of a SCSI bus. More particularly, the gate electrode of each of the emulating FETs 32a–n is coupled to the output of a control circuit 36, substantially identical to the control circuit 16 of FIG. 1 and having a control FET 40 coupled in series with a variable resistor 46 and controlled in a closed-loop manner by an amplifier 42. The drain electrodes of each of the plurality of emulating FETs 32a–n are coupled to a voltage regulator 38 providing a regulated voltage $V_{reg}$, like the voltage regulator 14 of FIG. 1. With this arrangement, each of the FETs 32a–n presents the same resistive impedance to a corresponding one of the plurality of conductors 34a–n.

Figure 4:
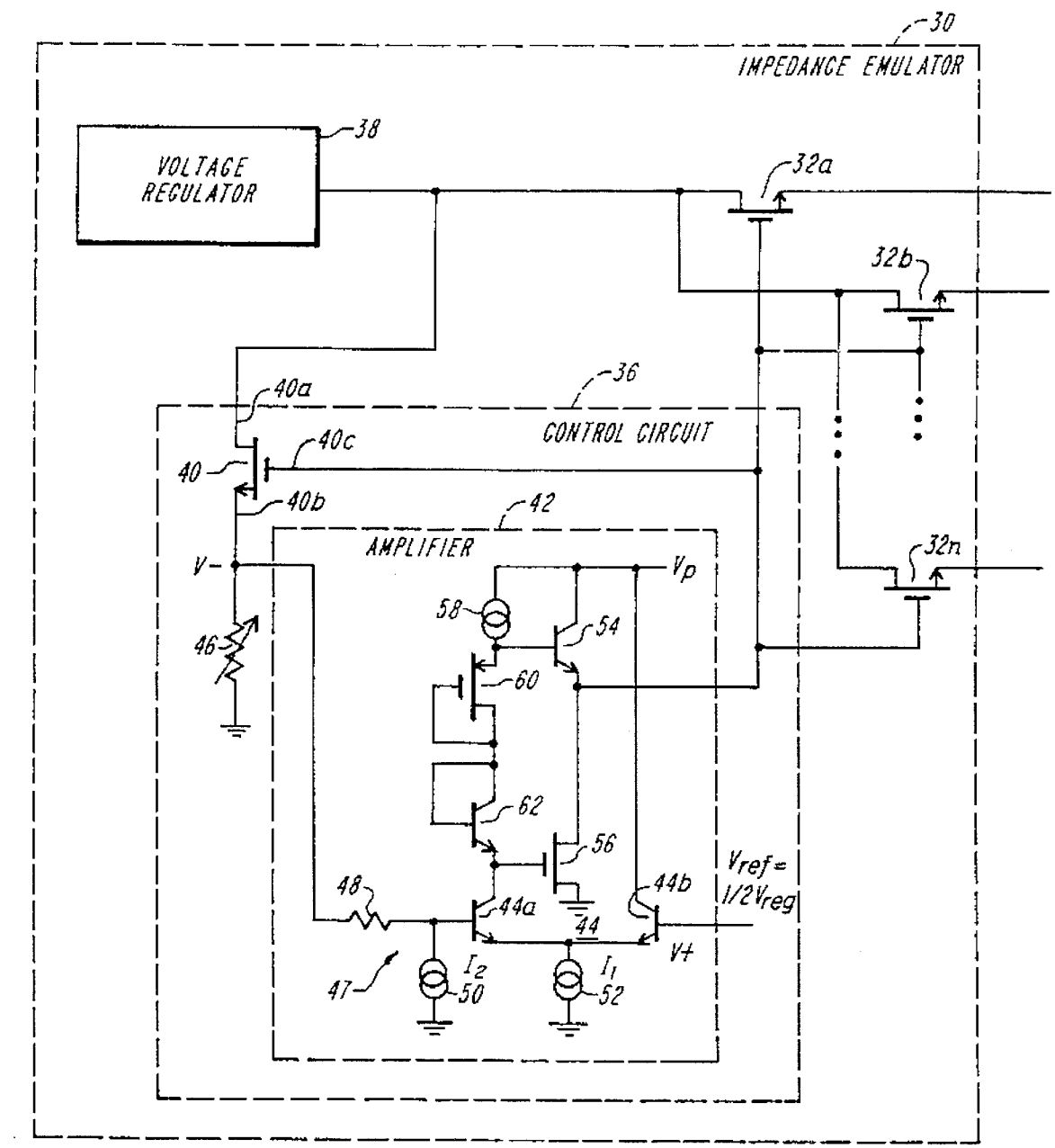
FIG. 4 is a detailed schematic of the active bus terminator of FIG. 3.

Referring to FIG. 4, a detailed schematic of the impedance emulator 30 of FIG. 3 is shown to include the plurality of emulating FETs 32a–n, voltage regulator 38, and control circuit 36. The control circuit 36 includes NMOS control FET 40 and variable resistor 46, as mentioned above. The non-inverting input V+ of the amplifier 42 receives the reference voltage $V_{ref}$=½$V_{reg}$, as shown. The inverting input V− to the amplifier 42 is coupled to the interconnection between the source electrode 40b of the control FET 40 and the resistor 46. A temperature compensation circuit 47, including a resistor 48 and a current source 50, is coupled between the inverting amplifier input V− and a differential input stage 44 including bipolar transistors 44a,b, as shown. The output stage of the amplifier 42 includes a bipolar transistor 54 coupled to a voltage source $V_p$ where $V_p$>>$V_{reg}$ and a FET 56, the interconnection between which provides the amplifier output $V_o$. In one illustrative embodiment, the regulated voltage $V_{reg}$ is equal to five volts and the voltage $V_p$ is on the order of ten to fifteen volts in order to provide sufficient gate voltage to the FETs 12, 20 to reduce second order effects, as discussed above. Output transistor 54 provides a low output impedance for maintaining loop stability while driving the plurality of emulating FETs 32a–n in the linear region of operation. A current source 58, a diode-connected FET 60, and a diode-connected bipolar transistor 62 are coupled in series between the voltage source $V_p$ and the input transistor 44a to maintain a bias current through transistors 54, 56 making this a class AB amplifier.

As temperature increases, the resistance value of resistor 46 increases. Without the temperature compensation circuit 47, the increased resistance of resistor 46 would cause the impedance of FETs 20 and 12 to concomitantly increase. The temperature compensation circuit 47 compensates for the effect of temperature variations on the resistance value of resistor 46. This compensation is achieved by using a resistor 48 and current whose voltage drop varies with temperature in the same manner as the impedance controlling resistor 46. More particularly, the voltage at the base of transistor 44a is equal to the voltage at the inverting amplifier input V− minus the product of the resistance of resistor 48 and current $I_2$. As the resistor 48 increases with temperature, the voltage V− at the inverting input of the amplifier 42 is made to increase at one half the rate of the temperature coefficient associated with resistor 46. This arrangement causes the resistance of FET 40 to remain constant with temperature since increasing the voltage V− has a dual effect of increasing the voltage $V_{DS}$ across the drain and source electrodes of the FET 40 and decreasing the current through the FET 40. As will be appreciated from the above discussion, maintaining the resistance of FET 12 constant with temperature concomitantly maintains the resistance of the emulating FETs 32a–n constant with temperature.

Figure 5:
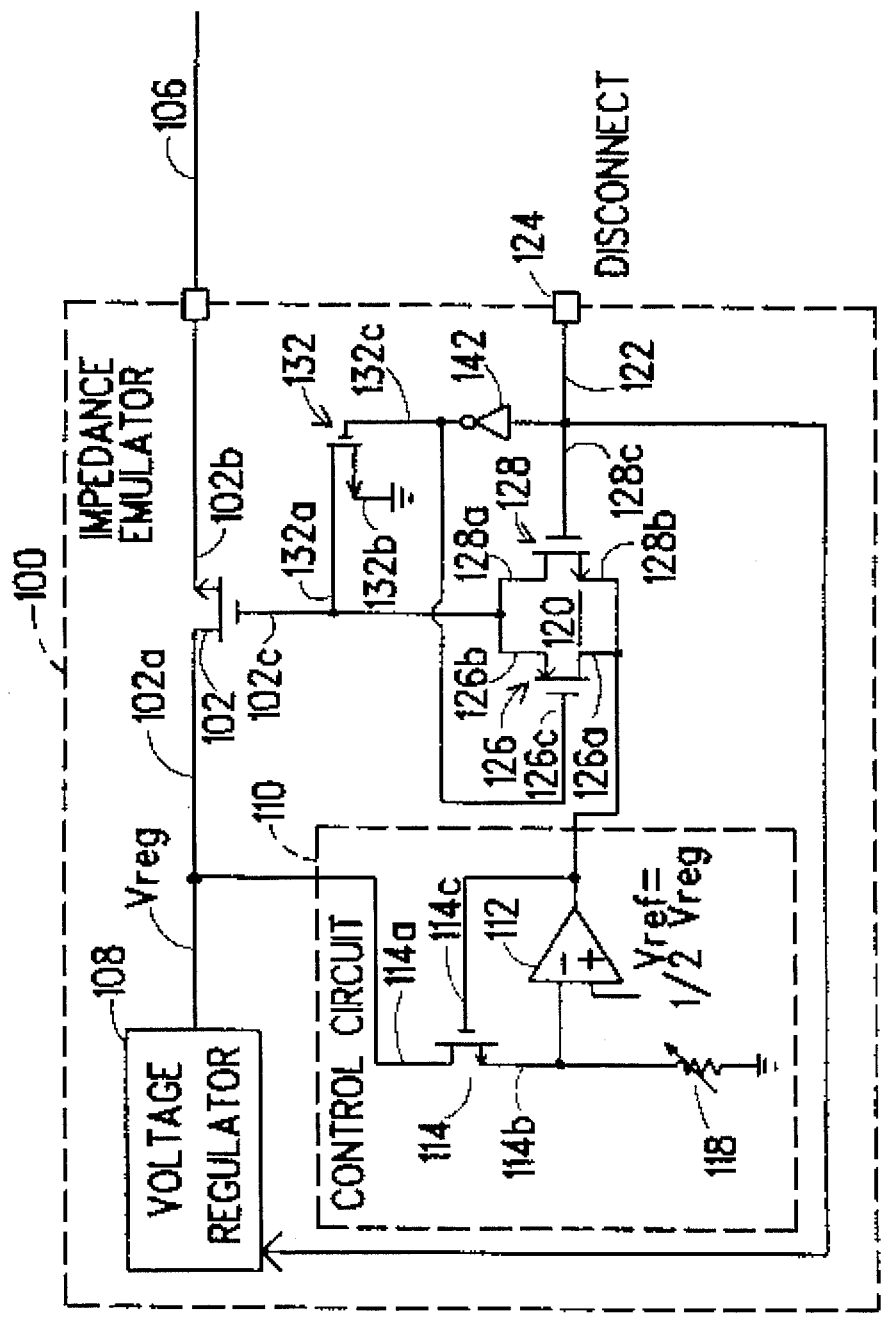
FIG. 5 is a schematic of an impedance emulator including a disconnect feature.

Referring to FIG. 5, an impedance emulator 100 is shown to include a disconnect feature. Otherwise, emulator 100 is substantially similar to the emulator 10 shown and described above in conjunction with FIG. 1. More particularly, emulator 100 includes an active emulating FET 102 for presenting a substantially linear predetermined impedance to a conductor 106 connected to the emulator 100. FET 102 includes a drain electrode 102a, a source electrode 102b, and a gate electrode 102c. A voltage regulator 108 provides a regulated voltage $V_{reg}$ to the drain electrode 102a of the emulating FET 102.

Emulator 100 further includes a control circuit 110 substantially identical to control circuit 16 of FIG. 1. Specifically, control circuit 110 includes an operational amplifier 112, a control FET 114 having a drain electrode 114a, a source electrode 114b, and a gate electrode 114c, as shown. The source electrode 114b of FET 114 is connected to a variable impedance selection resistor 118 and further to the inverting input of amplifier 112. The non-inverting input of amplifier 112 receives a reference voltage, such as the illustrated $\frac{1}{2}V_{reg}$. With this arrangement, control circuit 110 maintains the emulating FET 102 in the linear region of operation in order to provide a predetermined impedance across the drain and source electrodes 102a, 102b of FET 102. And, the impedance of the emulating FET 102 is adjustable by adjusting the resistance of variable resistor 118.

Emulator 100 further includes a disconnect feature for disconnecting the emulating FET 102 from conductor 106. To this end, an analog switch 120, including FETs 126, 128 and an inverter 142, is provided. Switch 120 is responsive to a disconnect control signal 122, provided at a disconnect pin 124 of the emulator 100, for selectively connecting or disconnecting the gate electrode 102c of FET 102 and the output of amplifier 112.

PMOS FET 126 of the analog switch 120 has a drain electrode 126a connected to the source electrode 128b of NMOS FET 128 and to the output of amplifier 112. A source electrode 126b of FET 126 is connected to the drain electrode 128a of FET 128 and to the gate electrode 102c of emulating FET 102. The gate electrode 128c of FET 128 receives the disconnect signal 122 from pin 124. The disconnect signal 122 is inverted by an inverter 142 and the inverted signal is connected to the gate electrode 126c of FET 126, as shown. The disconnect circuitry further includes an NMOS FET 132 having a drain electrode 132a connected to the gate electrode 102c of emulating FET 102, a source electrode 132b connected to ground, and a gate electrode 132c receiving the inverted disconnect signal, as shown.

In operation, when the disconnect signal 122 is in a logic high state, the gate electrode 102c of emulating FET 102 is connected to the output of amplifier 112 through the analog switch 120. Under this operating condition, the emulating FET 102 is maintained in the linear region of operation by control circuit 110, as discussed above in conjunction with FIG. 1. Alternatively, when the disconnect signal 122 is in a logic low state, the gate electrode 102c of emulating FET 102 is connected to ground through FET 132, thereby terminating conduction of emulating FET 102 so as to disconnect the impedance provided by the FET 102 from conductor 106.

More particularly, consider the case where the disconnect signal 122 is at a logic high level. A logic high on signal line 122 causes NMOS FET 128 to turn on. Since the disconnect signal 122 is inverted by inverter 142, resulting in a logic low level on gate electrode 126c of PMOS FET 126, FET 126 is likewise turned on. The effect of conducting, parallel-connected FETs 126, 128 is to reduce the conduction losses of the switch 120 (as compared to the use of a PMOS or NMOS FET alone). Note however that although switch 120 is shown to include parallel-connected NMOS and PMOS FETs 126, 128, respectively, it will be appreciated by those of skill in the art that various other types of switch arrangements may alternatively be used.

Since the gate electrode 132c of NMOS FET 132 is at a logic low level, FET 132 is turned off. With FETs 126, 128 conducting and FET 132 turned off, the gate electrode 102c of emulating FET 102 is connected to the output of amplifier 112, thereby permitting the FET 102 to be operated in the linear region to present a predetermined impedance to the conductor 106, as discussed above.

Consider next the case where the disconnect signal 122 is at a logic low level. In this case, NMOS FET 128 is turned off and, since the inverted disconnect signal is applied to the gate electrode 126c of PMOS FET 126, PMOS FET 126 is likewise turned off. However NMOS FET 132 conducts since the disconnect signal 122 applied to its gate electrode 132c is at a logic high level. Thus, the gate electrode 102c of emulating FET 102 is pulled to ground through conducting NMOS FET 132.

With this arrangement, a disconnect feature is provided, whereby the impedance presented to the conductor 106 by the emulating FET 102 can be selectively disconnected. This arrangement advantageously permits the emulator 100 to be switched on and off as desired in a particular application.

Figure 6:
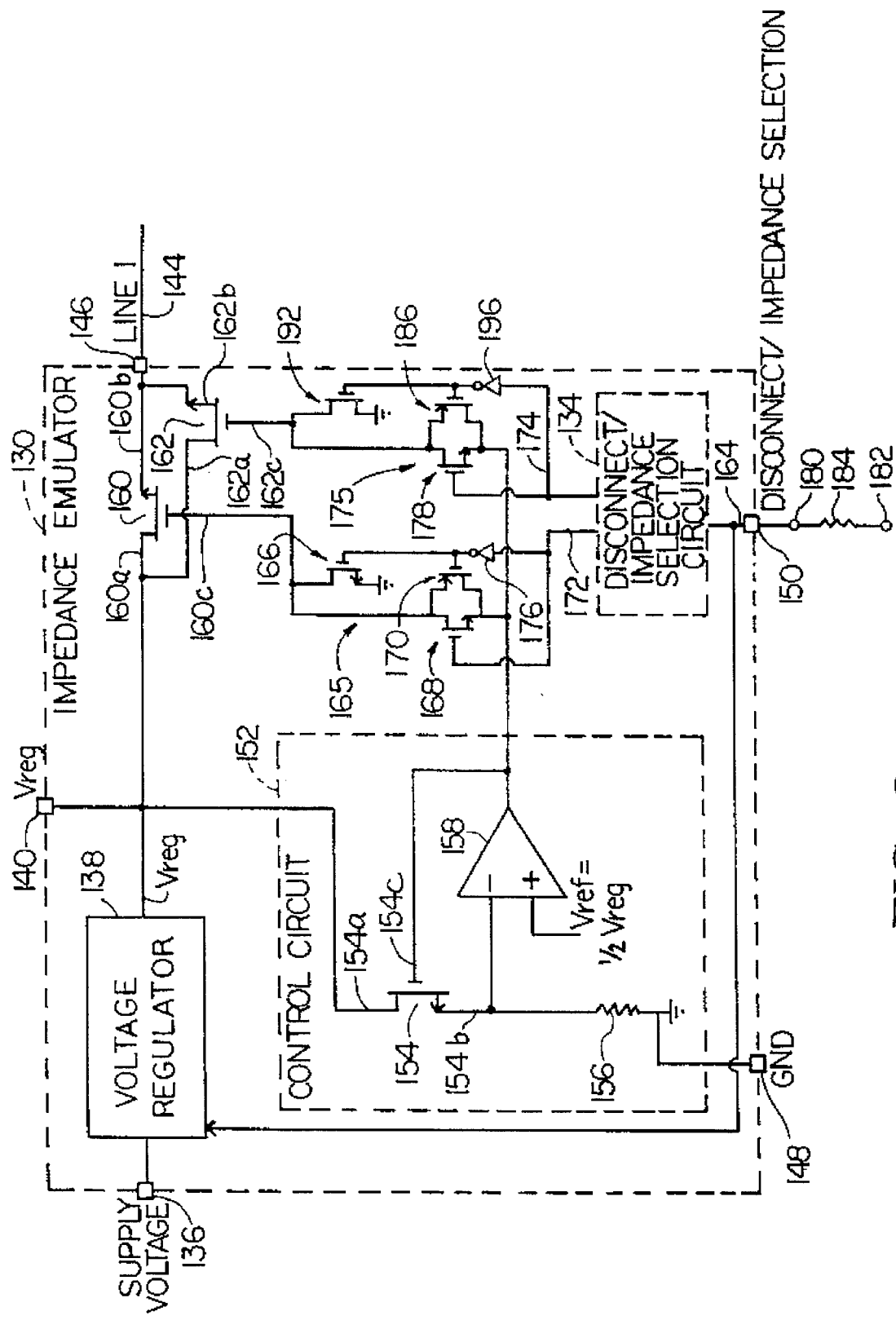
FIG. 6 is a schematic of an impedance emulator including disconnect and impedance selection features.

Referring also to FIG. 6, an emulator 130 includes a both disconnect and selectable impedance features. To this end, emulator 130 includes combination disconnect/impedance selection circuit 134. Like the emulator circuits discussed above, emulator 130 is preferably fabricated on an integrated circuit. To this end, a first pin 136 of emulator circuit 130 is adapted to receive a supply voltage for powering a voltage regulator 138. Regulator 138 provides a regulated voltage $V_{reg}$ which is accessible at a pin 140. The emulator 130 is adapted for connection to a conductor 144 at a pin 146. The emulator 130 further includes a ground pin 148 and a disconnect/impedance selection pin 150, as shown. The disconnect/impedance selection pin 150 is adapted for receiving a control signal for controlling both the disconnect and impedance selection features of the emulator 130, as will be described below.

A control circuit 152, substantially identical to circuit 110 of FIG. 5, includes a control FET 154 having a drain electrode 154a, a source electrode 154b, and a gate electrode 154c. The source electrode 154b of control FET 154 is connected to a resistor 156 and to an inverting input terminal of an operational amplifier 158. Operational amplifier 158 further has a non-inverting input terminal receiving a reference voltage $V_{ref}$ which, in one embodiment is equal to one-half of the regulated voltage $V_{reg}$, and an output terminal providing an output signal fed back to the gate electrode 154c of the control FET 154, as shown.

Impedance emulator 130 includes a plurality of emulating FETs 160, 162, each having a respective drain electrode 160a, 162a, source electrode 160b, 162b, and gate electrode 160c, 162c, as shown. The FETs 160, 162 are connected in parallel between the voltage regulator 138 and the conductor 144. That is, the drain electrodes 160a, 162a of FETs 160, 162, respectively, are connected to the voltage regulator 138 and the source electrodes 160b, 162b of respective FETs 160, 162 are connected to conductor 144. The FETs 160, 162 have different sizes relative to one another, so as to present different impedances between the respective drain and source electrodes. In one embodiment, emulating FET 160 provides a nominal impedance of 2.5KΩ and emulating FET 162 provides a nominal impedance of 110Ω. In operation, a selected one of the plurality of emulating FETs 160, 162 is connected to the control circuit 152 to present a predetermined impedance, associated with the selected FET, to the conductor 144. Since, in this embodiment, the impedance presented to the conductor 144 is adjusted by selecting one of a plurality of parallel-connected emulating FETs, the resistor 156 of the control circuit need not be a variable resistor.

The combination disconnect/impedance selection circuit 134 is responsive to a single disconnect/impedance selection signal 164 for generating switch control signals 172, 174. Control signals 172, 174 either disconnect both emulating FETs 160, 162 from the control circuit 152 by connecting the respective gate electrode 160c, 162c to ground or connect a selected one of the emulating FETs 160, 162 to the control circuit 152 in accordance with the desired impedance to be emulated, as will be described.

To this end, a first switch network 165 including FETs 166, 168, 170, and inverter 176 is responsive to control signal 172 for either connecting the gate electrode 160c of emulating FET 160 to the output of amplifier 158 or for connecting the gate electrode 160c of emulating FET 160 to ground, so as to effectively disconnect the FET 160 from conductor 144. More particularly, FETs 168, 170 are connected to provide an analog switch, with the source electrode of NMOS FET 168 connected to the drain electrode of PMOS FET 170 and the drain electrode of FET 168 connected to the source electrode of FET 170, as shown. The gate electrode of FET 168 receives the control signal 172 and the gate electrode of FET 170 receives an inverted version of the control signal 172, as inverted by inverter 176. The drain electrode of FET 168 and source electrode of FET 170 are connected to the gate electrode 160c of emulating FET 160 and to the drain electrode of NMOS FET 166. The source electrode of FET 166 is connected to ground and the gate electrode of FET 166 receives the inverted version of control signal 172, as shown.

In operation, when the control signal 172 is at a logic high level, FETs 168 and 170 conduct and FET 166 is turned off. In this condition, the gate electrode 160c of emulating FET 160 is connected to the output of amplifier 158 through conducting FETs 168–170. Thus, FET 160 is operated in its linear region to present a predetermined impedance to conductor 144. When the control signal 172 is at a logic low level on the other hand, FETs 168, 170 are turned off and FET 166 conducts to connect the gate electrode 160c of emulating FET 160 to ground, so as to effectively disconnect the emulating FET 160 from the conductor 144.

A similar switch network 175, connected to the gate electrode 162c of emulating FET 162, is responsive to control signal 174 from disconnect/impedance selection circuit 134 for either connecting the gate electrode 162c of FET 162 to the output of amplifier 158 or for connecting the gate electrode 162c to ground. More particularly, an analog switch, including parallel-connected FETs 178, 186, is connected between the gate electrode 162c of emulating FET 162 and the output of amplifier 158, as shown. NMOS FET 178 has a source electrode connected to the drain electrode of PMOS FET 186 and further to the output of amplifier 158. The drain electrode of FET 178 is connected to the source electrode of FET 186 and to the gate electrode 162c of FET 162. The gate electrode of FET 178 receives control signal 174 and the gate electrode of FET 186 receives an inverted version of control signal 174, as inverted by inverter 196. Also connected to the gate electrode 162c of FET 162 is an NMOS FET 192 having a source electrode connected to ground and a gate electrode receiving the inverted version of control signal 174, as shown.

When the control signal 174 is at a logic high level, FET 192 is turned off and FETs 178, 186 conduct to connect the gate electrode 162c of emulating FET 162 to the output of amplifier 158, thereby permitting FET 162 to be operated in the linear region by control circuit 152. When the control signal 174 is at a logic low level on the other hand, FETs 178, 186 are turned off and FET 192 conducts to connect the gate electrode 162c of emulating FET 162 to ground, so as to effectively disconnect FET 162 from conductor 144.

Figure 7:
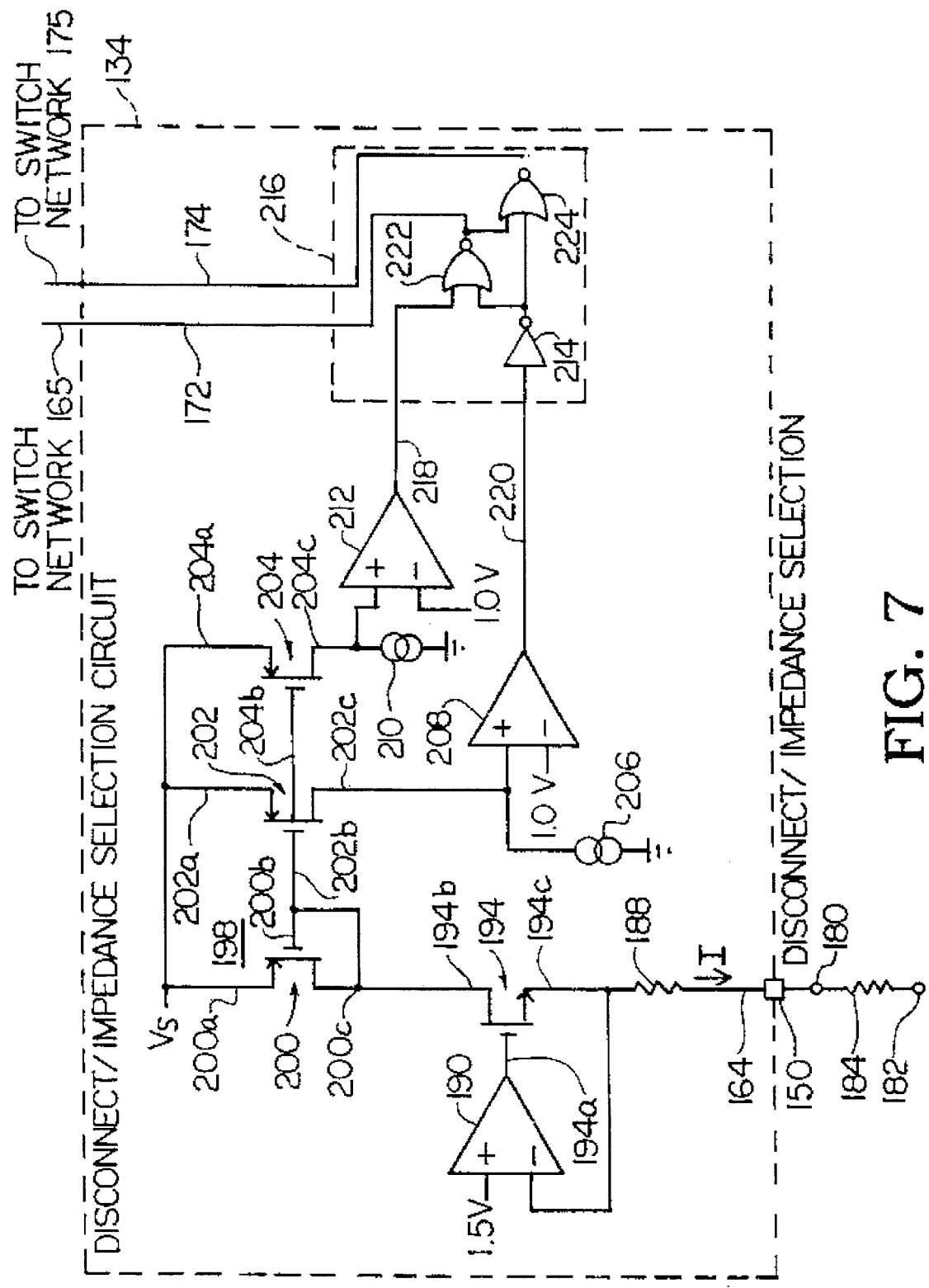
FIG. 7 is a schematic of the disconnect/impedance selection circuit of FIG. 6.

As will become apparent by reference to FIG. 7, in which the disconnect/impedance selection circuit 134 is shown in greater detail, at any given time, either (1) signals 172, 174 are both low, causing switches 166, 192 to conduct to connect the gate electrodes 160c, 162c of respective emulating FETs 160, 162 to ground; or (2) one of signals 172, 174 is high while the other is low causing a selected one of the emulating FETs 160, 162 to be connected to the output of amplifier 158.

The disconnect/impedance selection circuit 134 is responsive to a single control signal 164 for providing the control signals 172, 174. To accomplish this operation, the disconnect/impedance selection circuit 134 is responsive both to the logic state and to the impedance of the disconnect/impedance selection control signal 164. That is, if the control signal 164: is applied directly to pin 150 (i.e., at a terminal 180), then a first relatively low control signal impedance is presented to the pin 150; whereas, if the control signal 164 is applied to pin 150 through a series resistor 184 (i.e., at a terminal 182), a second higher control signal impedance is presented. In one embodiment, resistor 184 has a value between 80KΩ and 150KΩ.

Referring also to FIG. 7, a schematic of the combination disconnect/impedance selection circuit 134 is shown. Pin 150, at which the control signal 164 is applied, is connected to a first terminal of a resistor 188 having a second terminal connected to an inverting input terminal of an amplifier 190. Amplifier 190 has a non-inverting input terminal receiving a reference voltage, such as the illustrated 1.5 volts, and an output terminal connected to a gate electrode 194a of an NMOS FET 194. FET 194 has a drain electrode 194b and a source electrode 194c connected to the second terminal of resistor 188 and fed back to the inverting input terminal of amplifier 190, as shown.

A current mirror 198 includes a first, diode-connected FET 200 and second and third FETs 202 and 204, respectively. PMOS FET 200 has a source electrode 200a connected to a supply voltage $V_S$, a gate electrode 200b and a drain electrode 200c connected to gate electrode 200b and to the drain electrode 194b of FET 194. PMOS FET 202 has a source electrode 202a likewise connected to supply voltage $V_S$, a gate electrode 202b connected to the gate electrode 200b of FET 200, and a drain electrode 200c connected to the non-inverting input terminal of a comparator 208 and to a current source 206. The inverting input terminal of comparator 208 receives a reference voltage, such as the illustrative 1.0 volt. PMOS FET 204 has a source electrode 204a connected to supply voltage $V_S$, a gate electrode 204b connected to the gate electrode 202b of FET 202, and a drain electrode 204c connected to a current source 210 and to a non-inverting input terminal of a comparator 212. The inverting input terminal of comparator 212 receives a reference voltage, such as the illustrative 1.0 volt. Current sources 206 and 210 draw predetermined constant current levels, one greater than the other. For example, in one embodiment, current source 206 draws thirty microamps and current source 210 draws three-hundred microamps.

In operation, a current I is established through the signal path including FETs 200, 194 and resistor 188, the level of which varies in accordance with which terminal 180, 182 the disconnect/impedance selection signal 164 is applied to and the logic level of the disconnect/impedance selection signal. FET 194 and amplifier 190 maintain a constant 1.5 volts at the source electrode 194c of FET 194.

When the disconnect/impedance selection signal 164 is at a logic high level, regardless of whether such logic high signal is applied to terminal 180 or 182, the current I is less than the predetermined current drawn by the first current source 206; or in the illustrative embodiment, I is less than thirty microamps. A logic high disconnect/impedance selection signal 164 corresponds to disconnecting the emulating FETs 160, 162 from the conductor 144.

When current I, which is mirrored through FETs 202 and 204 by current mirror 198, is less than thirty microamps, the voltage at the non-inverting input terminal of comparator 208 is less than the reference voltage at the inverting input terminal, causing the comparator output signal 220 to remain in a logic low level. Since, under this condition, the current I is also less than three-hundred microamps, the voltage at the non-inverting input terminal of comparator 212 will be less than the reference voltage at the inverting input terminal, causing the comparator output signal 218 of comparator 212 to also remain low.

When the disconnect/impedance selection signal 164 is at a logic low level and is applied to terminal 180, then the current I is greater than the predetermined level of current drawn by the second current source 210, or in the illustrative embodiment, I is greater than three-hundred microamps. A logic low signal 164 at terminal 180 causes lower impedance emulating FET 162 to be connected to the control circuit 152, such as may be desirable when the conductor 144 is part of a relatively long communications bus. With the current I greater than three-hundred microamps, the output of comparator 212 is high. Since the current I is also greater than thirty microamps, the output signal 220 of comparator 208 is likewise at a logic high level.

Finally, when the disconnect/impedance selection signal 164 is at a logic low level and is applied to terminal 182, the current I is between the predetermined current levels drawn by the first and second current sources; or in the illustrative embodiment, I is between thirty and three-hundred microamps. This disconnect/impedance selection signal corresponds to connecting lower impedance emulating FET 160 to the control circuit 152, such as may be desirable when the conductor 144 forms part of a relatively short communications bus. Under this condition, the output signal 220 of comparator 208 is at a logic high level; whereas, the output signal 218 of comparator 212 is at a logic low level.

A logic circuit 216 receives output signals 218, 220 from comparators 208, 212, respectively, and processes signals 218, 220 to provide switch control signals 172, 174 as follows:

TABLE

| SIGNAL 218 | SIGNAL 220 | SIGNAL 172 | SIGNAL 174 |
|---|---|---|---|
| 0 | 0 | 0 | 0 |
| 0 | 1 | 1 | 0 |
| 1 | 0 | X | X |
| 1 | 1 | 0 | 1 | where a "0" represents a logic low level and a "1" represents a logic high level. More particularly, logic circuit 216 includes an inverter 214 inverting the output signal 220 of comparator 208. The output of inverter 214 is coupled to an input of NOR gates 222 and 224, as shown. NOR gate 222 additionally receives the comparator output signal 218 at a second input and provides, at an output, switch control signal 172. NOR gate 224 additionally receives switch control signal 172 and provides switch control signal 174 at an output thereof.

With this arrangement, when signals 218 and 220 are both at a logic low level, corresponding to the disconnect/impedance selection signal 164 being high in order to effectively disconnect FETs 160, 162 from conductor 144, the inputs to NOR gate 222 are a logic low level from signal line 218 and a logic high level from the output of inverter 214. The resulting output of NOR gate 222 (i.e., signal 172) is low. The inputs to NOR gate 224 are the logic low signal 172 and the logic high output of inverter 214. Thus, the output of NOR gate 224 is also low. Thus, when signals 218, 220 are low, switch control signals 172, 174 are likewise low, as indicated in the first entry of the Table above. Low control signals 172, 174 cause the gate electrodes 160c, 162c of FETs 160, 162 to be pulled to ground (FIG. 6) so as to effectively disconnect the emulating FETs 160, 162 from conductor 144.

Consider next the case where signals 218, 220 are both high, corresponding to the current I being greater than three-hundred microamps. This condition corresponds to a logic low disconnect/impedance selection signal 164 being applied to terminal 180 in order to present a lower impedance, such as 110 ohms, to conductor 144 (FIG. 6). In this case, NOR gate 222 receives a logic high signal 218 and the logic low output of inverter 214, resulting in a logic low switch control signal 172 at the output of NOR gate 222. NOR gate 224 receives the logic low control signal 172 and the logic low output of inverter 214, to provide a logic high switch control signal 174 at the output of NOR gate 224. Thus, when comparator output signals 218, 220 are both high, switch control signal 172 is low and switch control signal 174 is high, as indicated in the last entry in the above Table. This arrangement causes the gate electrode 162c of emulating FET 162 to be connected to the output of amplifier 158 and the gate electrode of FET 160 to be connected to ground, as discussed above in conjunction with FIG. 6.

Finally, consider the case where the current I is between thirty and three-hundred microamps. This condition corresponds to a logic low disconnect/impedance selection signal 164 being applied to terminal 182 in order to present a relatively high impedance, such as 2.5K ohms to conductor 144 (FIG. 6), and results in the output signal 218 of comparator 212 being at a logic low level and the output signal 220 of comparator 208 being at a logic high level. With this arrangement, the inputs to NOR gate 222 are the logic low signal 218 and the logic low output of inverter 214. The switch control signal 172 is thus at a logic high level, causing the gate electrode 160c of emulating FET 160 to be connected to the output of amplifier 158. The inputs to NOR gate 224 are the logic high control signal 172 and the logic low output of inverter 214, resulting in a logic low control signal 174. A logic low control signal 174 causes the gate electrode 162c of emulating FET 162 to be connected to ground (FIG. 6). Note that signal 218 will never be at a logic high level when signal 220 is at a logic low level. This is because such a condition would indicate that the current I is both greater than three-hundred microamps and less than thirty microamps.

Figure 8:
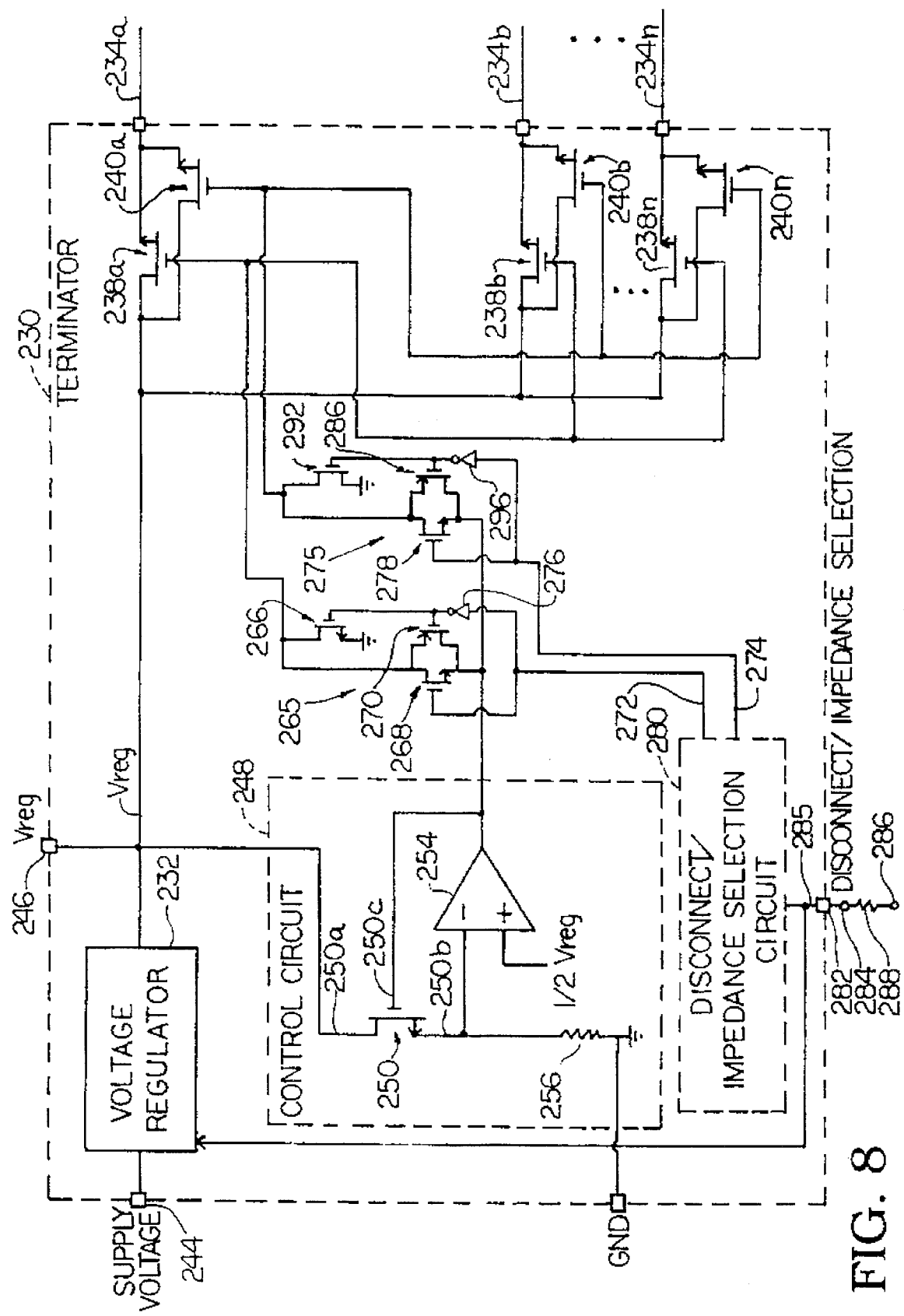
FIG. 8 is a schematic of an active bus terminator including the combination disconnect/impedance selection circuit of FIG. 7.

Referring to FIG. 8, a schematic of an active bus terminator 230 is shown to include both disconnect and impedance selection features. Terminator 230 is substantially similar to emulator 130 of FIG. 6 with the exception that terminator 230 is adapted for connection to a plurality of conductors 234a–n, such as the conductors of a SCSI bus, to actively terminate such conductors 234a–n. Terminator 230 includes a plurality of emulating FETs associated with each of the conductors 234a–n. In the illustrative embodiment, each conductor 234a–n has a pair of emulating FETs 238a, 240a–238n, 240n associated therewith, as shown. A first one 238a–n of each FET pair has a relatively low impedance associated therewith when driven in the linear region, such as 110Ω. And, a second one 240a–n of each FET pair has a relatively high impedance associated therewith when driven in the linear region, such as 2.5KΩ.

The terminator 230 further includes a voltage regulator 232 which is responsive to a supply voltage applied to a supply voltage pin 244 for providing a regulated voltage $V_{reg}$ at a pin 246. The terminator 230 also includes a control circuit 248 substantially identical to control circuit 152 in FIG. 6. That is, control circuit 248 includes a control FET 250, like FET 154, an operational amplifier 254, like operational amplifier 158, and a resistor 256, like resistor 156. Control FET 250 has a drain electrode 250a connected to the voltage regulator 232, a source electrode 250b connected to the inverting input terminal of amplifier 254, and a gate electrode 250c connected to the output terminal of amplifier 254. The non-inverting input terminal of amplifier 254 receives a reference voltage, such as the illustrative ½$V_{reg}$.

In one embodiment, resistor 256 is a thin film resistor having a substantially constant resistance over a relatively wide temperature range. With this arrangement, since the effect of temperature variations on resistor 256 is reduced, the need for the temperature compensation circuit 47 (FIG.4) is likewise reduced.

As described above in conjunction with FIG. 6, each FET pair 238a, 240a–238n, 240n has interconnected drain electrodes further connected to the output of voltage regulator 232 and interconnected source electrodes further connected to the respective conductor 234a–n. The terminator 230 further includes a disconnect/impedance selection circuit 280, identical to like circuit 134 of FIGS. 6 and 7, and responsive to a disconnect/impedance selection control signal 285 supplied to a disconnect/impedance selection pin 282 either at a first terminal 284 or at a second terminal 286 and connected to pin 282 through a resistor 288.

A first switch network 265 is connected between the gate electrode of emulating FETs 238a–n and the output of amplifier 254 and a second switch network 275 is connected between the gate electrode of emulating FETs 240a–n and the output of amplifier 254, as shown. Switch networks 265, 275 are substantially identical to respective switch networks 165, 175 of FIG. 6 and are controlled by respective switch control signals 272, 274 provided by the disconnect/impedance selection circuit 280 in the same manner that respective switch control signals 172, 174 are provided by circuit 134.

In operation, when switch control signals 272, 274 are at a logic low level, corresponding to a logic high disconnect/impedance selection signal 285 being applied to terminal 282 to 286, all of the emulating FETs 238a–n, 240a–n are effectively disconnected from the respective conductors 234a–n. That is, FETs 268, 270, 278 and 286 are turned off under this condition and FETs 266 and 292 conduct to connect the gate electrodes of respective FETs 238a–n, 240a–n to ground.

When switch control signal 272 is at a logic high level and switch control signal 274 is at a logic low level, lower impedance emulating FETs 238a–n are connected to control circuit 248 so as to present a relatively low impedance, such as 110 ohms, to the respective conductors 234a–n. More particularly, the logic high signal 272 causes FETs 268 and 270 to conduct so as to connect the gate electrodes of emulating FETs 238a–n to the output of amplifier 254. And, the logic low signal 274 causes FET 292 to conduct, thereby causing the gate electrodes of FETs 240a–n to be pulled to ground through FET 292.

Finally, when switch control signal 274 is at a logic high level and switch control signal 272 is at a logic low level, higher impedance FETs 240a–n are connected to control circuit 248 to present a relatively high impedance, such as 2.5K ohms, to the respective conductors 234a–n. The logic high signal 274 causes FETs 278, 286 to conduct to connect the gate electrodes of emulating FETs 240a–n to the output of amplifier 254 and the logic low signal 272 causes FET 266 to conduct to connect the gate electrodes of emulating FETs 238a–n to ground.

With this arrangement, an active bus terminator 230 is provided with several advantageous features. First, the terminator 230 is disconnectable from the conductors 234a–n in response to a logic high control signal applied to pin 282. Furthermore, the impedance presented to the conductors 234a–n by the terminator 230 is selectable in response to the same control signal applied to pin 282. Thus, advantageously, both the disconnect and impedance selection features are implemented with the use of only a single pin 282. The circuitry of the combination disconnect/impedance selection circuit 280 decodes the control signal, based on both the logic state and impedance of such signal, to appropriately disconnect all emulating FETs 238a–n, 240a–n from the respective conductors 234a–n, or alternatively, to connect a selected emulating FET to the control circuit 248 so as to present a desired impedance to the respective conductor 234a–n.

Figure 9:
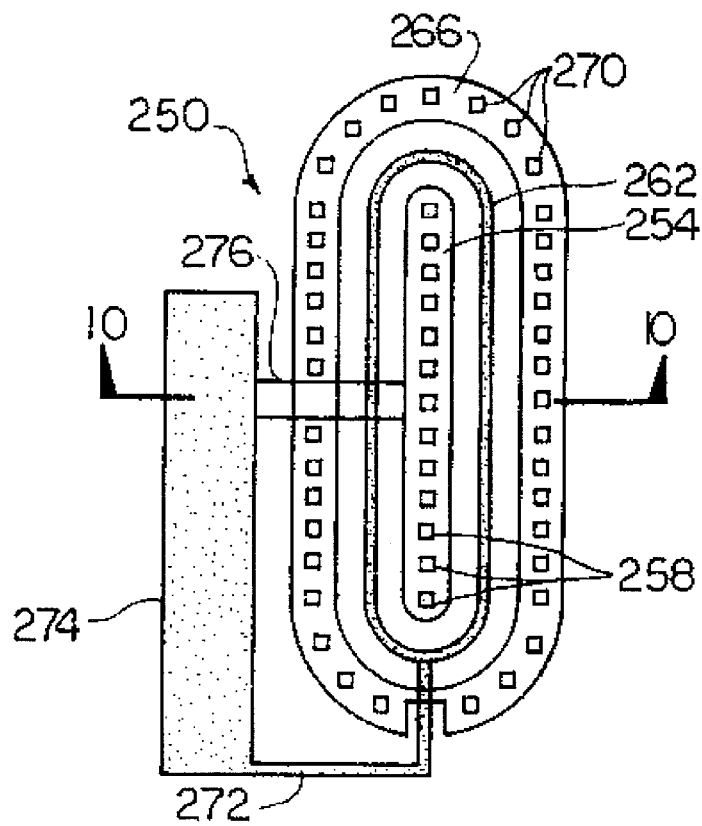
FIG. 9 is a plan view of an NMOS emulating FET.

Referring also to FIG. 9, a plan view of an NMOS FET 250 well suited for use as an emulating FET in the circuits described above, such FETs 238a–n, 240a–n in FIG. 8, is shown. The NMOS FET 250 includes features which optimize the performance of the device in response to an ESD event, as will be described. NMOS FET 250 includes a centrally positioned source region 254, over which a plurality of source contacts 258 are disposed in electrical connection to the source region 254. A substantially annular-shaped gate regions 262 is concentrically positioned around the source region 254 and a substantially annular-shaped drain region 266 is positioned concentrically around the gate region 262 with drain contacts 270 positioned thereover in electrical connection to the drain region 266, as shown. In the illustrative embodiment, the gate and drain regions 262, 266 are more specifically oval-shaped.

NMOS FET 250 additionally includes a capacitor plate 274 electrically connected to the gate region 262 via conductive region 272 and extending along a side of the FET 250, as shown. The capacitor plate 274 is additionally electrically connected to the source region 254 via a conductive region 276.

Figure 10:
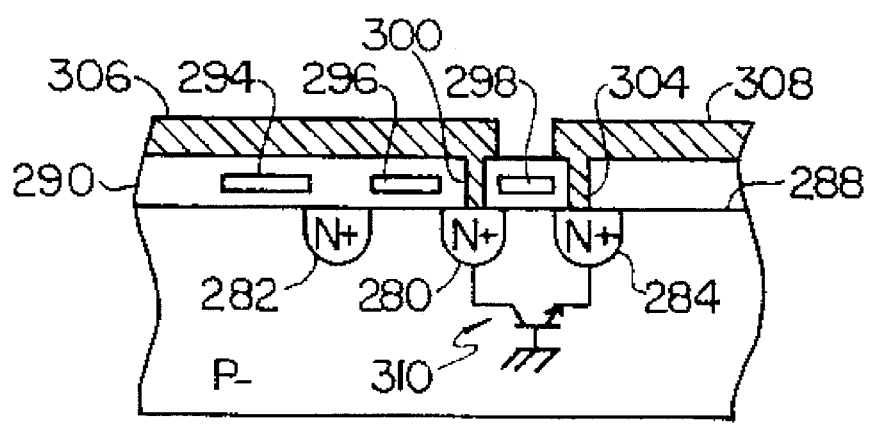
FIG. 10 is a cross-sectional view of the NMOS emulating FET of FIG. 9.

Referring also to FIG. 10, a cross-sectional view of the FET 250 taken along line 10—10 in FIG. 9 is shown to include a P–substrate having a top surface 288 in which N+ type diffusion regions 280, 282, 284 are formed. The central diffusion region 280 provides the source region 254 (FIG. 9) and the diffusion regions 282, 284 provide the substantially annular-shaped drain region 266 (FIG. 9).

Over the top surface 288 of the P– type substrate is disposed a layer 290 of silicon dioxide in which polysilicon regions 294, 296, 298 are embedded, as shown. Polysilicon regions 296, 298 provide the substantially annular-shaped gate region 262 (FIG. 9), while polysilicon region 294 provides the capacitor plate 274 (FIG. 9). Source and drain contacts 258, 270 are provided by metal portions 300, 304, respectively, which extend through the silicon dioxide layer 290, as shown. Metal regions 306, 308 provide pads which extend over the top surface of the silicon dioxide layer 290 to interconnect multiple source and drain contacts 258, 270, respectively.

The FET 250 includes an npn device 310 having a collector electrode at the source diffusion 280, an emitter electrode at the drain diffusion 284, and a base electrode at the grounded P–substrate, as shown. In response to an ESD event at pad 306 (i.e., which is electrically connected to the source electrode of the FET 250), the ESD induced voltage couples into the gate region 262 of the FET through the capacitor plate 274 connected between the source region 254 and the gate region 262. The effect of this coupling is to cause the FET 250 to conduct and absorb some of the ESD energy. If the voltage at the pad 306 continues to rise, the npn device 310 will begin to break down and clamp the voltage across its collector and emitter terminals to a first predetermined level. If the current exceeds a predetermined value, then the voltage across the collector and emitter terminals of the npn device 310 will begin to exhibit a "snap back" characteristic, whereby the voltage clamps to a lower level than the first predetermined level. This characteristic is desirable in order to absorb large amounts of ESD energy, while maintaining a relatively low clamp voltage.

As is apparent from the cross-sectional view of FIG. 10, regions 300, 304 (which provide the source and drain contacts 258, 270 of FIG. 9, respectively), are spaced from regions 296, 298 (which provide the gate region 262 in FIG. 9). The use of substantially annular-shaped gate and drain regions 262, 266, as well as the spacing of the source and drain contacts 258, 270 from the gate diffusion region 262, serve to increase the uniformity of current and electric field distribution in response to an ESD event. Thus, use of the NMOS FET of FIG. 9 in the impedance emulator/terminator embodiments discussed above advantageously reduces the likelihood of an ESD event: catastrophically damaging the device and related circuitry.

Having described the preferred embodiments of the invention, it will be apparent to one of skill in the art that other embodiments incorporating their concepts may be used. For example, it will be appreciated that the particular logic states of the signals described herein is illustrative only and can be readily varied. Accordingly, the invention should be limited only by the spirit and scope of the appended claims.

I claim:

1. A bus terminator for terminating a conductor of a bus having an impedance associated therewith comprising:

a voltage regulator providing a regulated voltage;

an emulating FET having a first electrode, a second electrode, and a third electrode, said second and third electrodes adapted for being coupled in series between said voltage regulator and said conductor; and a control circuit coupled to said first electrode of said emulating FET for maintaining said emulating FET in a linear region of operation so as to provide a substantially fixed resistive impedance to said conductor, said substantially fixed resistive impedance substantially matching said impedance of said conductor.

2. The terminator recited in claim 1 wherein said emulating FET is an NMOS device and wherein said first electrode is a gate electrode, said second electrode is a drain electrode coupled to said voltage regulator, and said third electrode is a source electrode adapted for coupling to said conductor.

3. The terminator recited in claim 2 wherein said gate electrode of said NMOS device comprises a gate region and a gate contact, said source electrode of said NMOS device comprises a source regions and a source contact and said drain electrode of said NMOS device comprises a drain region and a drain contact and wherein said source region is centrally located and surrounded by a substantially annular gate region and a :substantially annular drain region.

4. The terminator recited in claim 1 further comprising a plurality of emulating FETs, each one adapted for coupling in series between said voltage regulator and said conductor and wherein said control circuit is coupled to said first electrode of a selected one of said plurality of emulating FETs.

5. A bus terminator for terminating a conductor of a bus having an impedance associated therewith comprising:

a voltage regulator providing a regulated voltage;

an emulating FET having a first electrode, a second electrode, and a third electrode, said second and third electrodes adapted for being coupled in series between said voltage regulator and said conductor; and a control circuit coupled to said first electrode of said emulating FET for maintaining said emulating FET in a linear region of operation so as to provide a resistive impedance to said conductor, said resistive impedance substantially matching said impedance of said conductor, said control circuit comprising:

(a) a control FET having a gate electrode, a source electrode, and a drain electrode;

(b) a variable resistor having an adjustable resistance value associated therewith and coupled in series with said control FET; and (c) an amplifier providing an output signal coupled to said gate electrode of a control FET and said gate electrode of said emulating FET, said output signal causing said control FET and said emulating FET to provide an impedance having a predetermined relationship with respect to said resistance value of said resistor.

6. The terminator recited in claim 5 wherein said resistor is a variable resistor having a variable resistance value associated therewith so that said impedance provided by said emulating FET is adjustable in accordance with said variable resistance value.

7. The terminator recited in claim 5 wherein said amplifier has a pair of inputs, a first one receiving a reference voltage of approximately one-half the regulated voltage and a second one coupled to said resistor and said source electrode of said control FET.

8. The terminator recited in claim 5 wherein said amplifier includes a temperature compensation circuit for compensating for the effect of temperature variations on said resistance value of said resistor.

9. A circuit for providing an emulated impedance for terminating a conductor having an impedance associated therewith comprising:

a voltage source;

an emulating FET coupled to said voltage source and having a gate electrode, a source electrode, and a drain electrode, wherein said emulating FET has said emulated impedance between said drain and source electrodes, said emulated impedance substantially matching said impedance of said conductor; and a control circuit coupled to said gate electrode of said emulating FET for providing a control signal to maintain said emulating FET in a linear region of operation, said control circuit comprising a variable resistor having an adjustable resistance value, wherein said control signal causes said emulating FET to provide an impedance proportional to said resistance value and adjustable in accordance with said variable resistance value, said emulated impedance between said drain and source electrodes being substantially fixed at said impedance proportional to said resistance value.

10. The circuit recited in claim 9 wherein said control circuit further comprises a control FET having a gate electrode, a source electrode, and a drain electrode and an amplifier providing an output signal coupled to said gate electrode of said control FET and said gate electrode of said emulating FET.

11. The circuit recited in claim 9 wherein said amplifier has a pair of inputs, a first one receiving a reference voltage equal to a predetermined fraction of a voltage provided by said voltage source and a second one coupled to said resistor and said control FET.

12. The circuit recited in claim 9 wherein said emulating FET is an NMOS device.

13. The circuit recited in claim 9 wherein said emulating FET is an NMOS device comprising a source region, a substantially annular shaped gate region disposed around said source region, and a substantially annular drain region disposed around said gate region.

14. A terminator for terminating a conductor having an impedance associated therewith comprising:

a voltage source having a voltage level associated therewith;

a plurality of emulating FETs, each having a first electrode, a second electrode, and a third electrode, said second and third electrodes of each of said plurality of emulating FETs adapted for being coupled in series between said voltage source and said conductor; and a control circuit coupled to said first electrode of a selected one of said plurality of emulating FETs for maintaining said selected emulating FET in a linear region of operation so as to provide a substantially fixed impedance to said conductor corresponding to said selected emulating FET, said substantially fixed impedance substantially matching said impedance of said conductor.

15. The terminator recited in claim 14 further comprising a disconnect switch for selectively disconnecting ones of said plurality of emulating FETs from said conductor.

16. The terminator recited in claim 15 wherein said disconnect switch is responsive to a common control signal for selecting one of said plurality of emulating FETs for connection to said conductor or disconnecting each of said plurality of emulating FETs from said conductor.

17. The terminator according to claim 14, wherein said control circuit further comprises an amplifier arid a control FET coupled in a feedback relationship to said amplifier.

18. The terminator according to claim 17, wherein said control FET includes a gate electrode, a source electrode, and a drain electrode and, said amplifier includes a pair of inputs and an output, wherein said amplifier output is coupled to said first electrode of a selected one of said plurality of emulating FETs and to said control FET gate electrode and said control FET source electrode is coupled to a first of said pair of inputs and said control FET drain electrode is coupled to said voltage source.

19. The terminator according to claim 16, further comprising a disconnect/impedance selection circuit coupled to said disconnect switch and responsive to said common control signal having an impedance and a logic state.

20. The terminator according to claim 19, wherein said disconnect/impedance circuit is responsive to said impedance and said logic state of said common control signal for selecting one of said plurality of emulating FETs for connection to said conductor or disconnecting each of said plurality of emulating FETs from said conductor.

21. A terminator for terminating a conductor having an impedance associated therewith comprising:

a voltage source having a voltage level associated therewith;

an emulating FET having a gate electrode, a source electrode, and a drain electrode, said source and drain electrodes adapted for being coupled in series between said voltage source and said conductor;

a control circuit for maintaining said emulating FET in a linear region of operation so as to provide a substantially fixed impedance of said conductor, said substantially fixed impedance substantially matching said impedance of said conductor; and a disconnected switch coupled to said gate electrode of said emulating FET for turning off said emulating FET in response to a disconnect signal provided to said terminator.

22. The terminator recited in claim 21 wherein said disconnect switch comprises a first switch connected between said gate electrode of said emulating FET and ground and a second switch connected between said gate electrode of said emulating FET and said control circuit.

23. The terminator according to claim 21, wherein said control circuit further comprises an amplifier and a control FET coupled in a feedback relationship to said amplifier, said amplifier coupled to said emulating FET gate electrode.

24. The terminator according to claim 23, wherein said control FET includes a first electrode, a second electrode, and a third electrode and, said amplifier includes a pair of inputs and an output, wherein said amplifier output is coupled to said gate electrode of a selected one of said plurality of emulating FETs and to said control FET first electrode and said control FET second electrode is coupled to a first of said pair of inputs and said control FET third electrode is coupled to said voltage source.

25. A terminator for terminating a conductor comprising:
   a voltage source having a voltage level associated therewith;
   an emulating FET having a gate electrode, a source electrode, and a drain electrode, said source and drain electrodes adapted for being coupled in series between said voltage source and said conductor;
   a control circuit for maintaining said emulating FET in a linear region of operation so as to provide a termination impedance to said conductor; and
   a disconnect switch coupled to said gate electrode of said emulating FET for turning off said emulating FET in response to a disconnect signal provided to said terminator;
   wherein said voltage source is responsive to said disconnect signal for entering a low power mode of operation.

26. A circuit for terminating a conductor, said circuit comprising:
   (a) a voltage regulator providing a regulated voltage;
   (b) a first emulating FET having a gate electrode, a source electrode, and a drain electrode, said drain and source electrodes being adapted for coupling in series between said voltage regulator and said conductor;
   (c) a second emulating FET having a gate electrode, a source electrode, and a drain electrode, said drain and source electrodes adapted for coupling in series between said voltage regulator and said conductor;
   (d) a control circuit providing a control signal to maintain a selected one of said first and second emulating FETs in a linear region of operation, said control circuit comprising:
      (i) a control FET having a gate electrode, a source electrode, and a drain electrode coupled to said voltage regulator;
      (ii) a resistor coupled to said control FET; and
      (iii) an amplifier having a pair of input terminals and an output terminal, a first one of said pair of input terminals receiving a reference voltage, a second one of said pair of input terminals being coupled to said resistor, and said output terminal being coupled to said gate electrode said control FET;
   (e) a first switch network connected between said output of said amplifier and said gate electrode of said first emulating FET, said first switch network adapted for connecting said gate electrode of said first emulating FET to ground or to said output of said amplifier in response to a first switch control signal;
   (f) a second switch network connected between said output of said amplifier and said gate electrode of said second emulating FET, said second switch network adapted for connecting said gate electrode of said second emulating FET to ground or to said output of said amplifier in response to a second switch control signal; and
   (g) a disconnect/impedance selection circuit for generating said first and second switch control signals in response to a single user provided signal.

27. The circuit recited in claim 26 wherein said resistor of said control circuit is a thin film resistor.

28. The circuit recited in claim 26 further comprising a temperature compensation circuit for reducing the effect of temperature on said resistor of said control circuit.

29. A terminator for terminating a conductor having an impedance associated therewith comprising:
   a voltage source providing a reference voltage and a supply voltage;
   a plurality of emulating FETs, each having a first electrode, a second electrode, and a third electrode, said second and third electrodes of each of said plurality of emulating FETs adapted for being coupled in series between said reference voltage and said conductor, said plurality of emulating FETs each having a predetermined impedance;
   a control circuit including an amplifier and a control FET coupled in a feedback relationship to said amplifier, said amplifier coupled to said first electrode of a selected one of said plurality of emulating FETs for maintaining said selected emulating FET in a linear region of operation to present said predetermined impedance to said conductor corresponding to said selected emulating FET, said predetermined impedance substantially matching said impedance of said conductor;
   a disconnect switch for selectively disconnecting said plurality of emulating FETs from said conductor; and
   a disconnect/impedance selection circuit adapted for being coupled to said disconnect switch and responsive to a said single user provided signal controlling said disconnect/impedance selection circuit, wherein a first one of said plurality of emulating FETs is active presenting a first predetermined impedance to said conductor when said single user provided signal is in a first logic state having a first control impedance, and a second one of said plurality of emulating FETs is active presenting a second predetermined impedance to said conductor when said single user provided signal is in said first logic state having a second control impedance, and wherein said first and second ones of said plurality of emulating FETs are disconnected from said conductor when said single user provided signal is in a second logic state.

30. The terminator according to claim 29, wherein said disconnect/impedance selection circuit comprises:
   (a) a current mirror;
   (b) a first and second comparator circuit coupled to said current mirror;
   (c) a disconnect logic circuit coupled to said first and second comparator circuit for providing a first and second switch control signal; and
   (d) an amplifier feedback circuit adapted for being coupled in series between said current mirror and said user provided control signal.

31. The terminator according to claim 30, wherein said current mirror comprises:
   first, second, and third current mirror FETs, each including a gate electrode, a source electrode, and a drain electrode, said first current mirror FET being diode connected;
   said first, second and third current mirror FET gate electrodes being commonly connected;
   said first, second, and third current mirror FET source electrodes being coupled to said supply voltage;
   said first current mirror FET drain electrode coupled to said amplifier feedback circuit, said second current mirror FET drain electrode coupled to said first comparator circuit, said third current mirror FET drain electrode coupled to said second comparator circuit.

32. The terminator according to claim 30, wherein said amplifier circuit comprises:

a resistor having a first terminal and a second terminal, said first terminal receiving said user provided signal;

an amplifier having a pair of input terminals and an output terminal, a first of said pair of input terminals coupled to said resistor second terminal, a second of said pair of input terminals receiving a threshold voltage; and an amplifier FET having a gate electrode, a source electrode, and a drain electrode, said gate electrode coupled to said amplifier output terminal, said drain electrode coupled to said current mirror, and said source electrode coupled to said resistor second terminal.

33. The terminator according to claim 30, wherein said first comparator circuit comprises:

a first current source; and a first comparator having a pair of input terminals and an output terminal, a first of said pair of input terminals coupled to said current mirror and to said first current source, said output terminal coupled to said disconnect logic circuit, and a second of said pair of input terminals coupled to a comparator threshold voltage;

said second comparator circuit comprising:

a second current source; and a second comparator having a pair of input terminals and an output terminal, a first of said pair of input terminals coupled to said current mirror and to said second current source, said output terminal coupled to said disconnect logic circuit, and a second of said pair of input terminals coupled to said comparator threshold voltage.

* * * * *

UNITED STATES PATENT AND TRADEMARK OFFICE
CERTIFICATE OF CORRECTION

PATENT NO    :    B1 5,585,741
DATED        :    May 2, 2000
INVENTOR(S)  :    Mark Jordan It is certified that error appears in the above-identified patent and that said Letters Patent are hereby corrected as shown below:

Column 3, line 23 (claim 5) reads, "and"

should read --an--.

Column 4, line 14 reads, "a sourcd electrode"

should read --a source electrode--.

Column 4, line 17 reads, "gate of a selected one"

should read --gate electrode of a selected one--.

Signed and Sealed this

Tenth Day of April, 2001

*Attest:*

NICHOLAS P. GODICI

*Attesting Officer*      *Acting Director of the United States Patent and Trademark Office*

UNITED STATES PATENT AND TRADEMARK OFFICE
CERTIFICATE OF CORRECTION

PATENT NO. : B1 5,585,741
DATED : May 2, 2000
INVENTOR(S) : Mark Jordan

It is certified that error appears in the above-indentified patent and that said Letters Patent is hereby corrected as shown below:

Column 4, lines 55-56 (claim 25) reads, "a electrode"

should read --a gate electrode--.

Column 4, line 57 reads, "surce"

should read --source--.

Column 5, line 49 (claim 29) reads, "(FET),"

should read --(FETs)--.

Signed and Sealed this

Tenth Day of April, 2001

Attest:

NICHOLAS P. GODICI

*Attesting Officer*      *Acting Director of the United States Patent and Trademark Office*

REEXAMINATION CERTIFICATE (4075th)

United States Patent [19]
Jordan

[11] B1 5,585,741
[45] Certificate Issued May 2, 2000

[54] IMPEDANCE EMULATOR

[75] Inventor: Mark Jordan, Goffstown, N.H.

[73] Assignee: Unitrode Corporation, Merrimack, N.H.

Reexamination Request:
No. 90/004,968, Apr. 16, 1998

Reexamination Certificate for:
Patent No.: 5,585,741
Issued: Dec. 17, 1996
Appl. No.: 08/425,959
Filed: Apr. 19, 1995

Related U.S. Application Data

[63] Continuation-in-part of application No. 08/231,394, Apr. 22, 1994, abandoned.
[51] Int. Cl.[7] .................. H03K 17/16; H03K 19/0944
[52] U.S. Cl. ........................ 326/30; 326/32; 326/86; 333/22 R
[58] Field of Search ................... 326/21, 30, 31–32, 326/34, 86; 333/22 R, 32; 375/257

[56] References Cited

FOREIGN PATENT DOCUMENTS 2 248 143   3/1992   United Kingdom .

*Primary Examiner*—Jon Santamauro

[57] ABSTRACT

A low capacitance impedance emulator suitable for active conductor termination. The impedance emulator includes an emulating FET and a control circuit coupled to the gate of the emulating FET for maintaining the FET in a linear region of operation. The control circuit includes a control FET, an impedance setting resistor, and amplifier. The control FET is driven in a closed-loop fashion so that the impedance of the control FET has a known relationship with respect to that of the resistor. The output of the amplifier controls the conduction of both the emulating and control FETs so that the emulating FET provides an impedance proportional to that of the control FET and thus, related to the impedance of the resistor. A disconnect feature is provided, whereby the impedance emulator is responsive to a disconnect signal for disconnecting the impedance provided by the emulating FET. The impedance provided by the emulating FET is selectable by adjusting the impedance setting resistor or, in one embodiment, the impedance is selectable in response to an impedance selection signal which causes one of a plurality of FETs to operate as the emulating FET. An NMOS FET having features providing enhanced ESD performance is also provided.

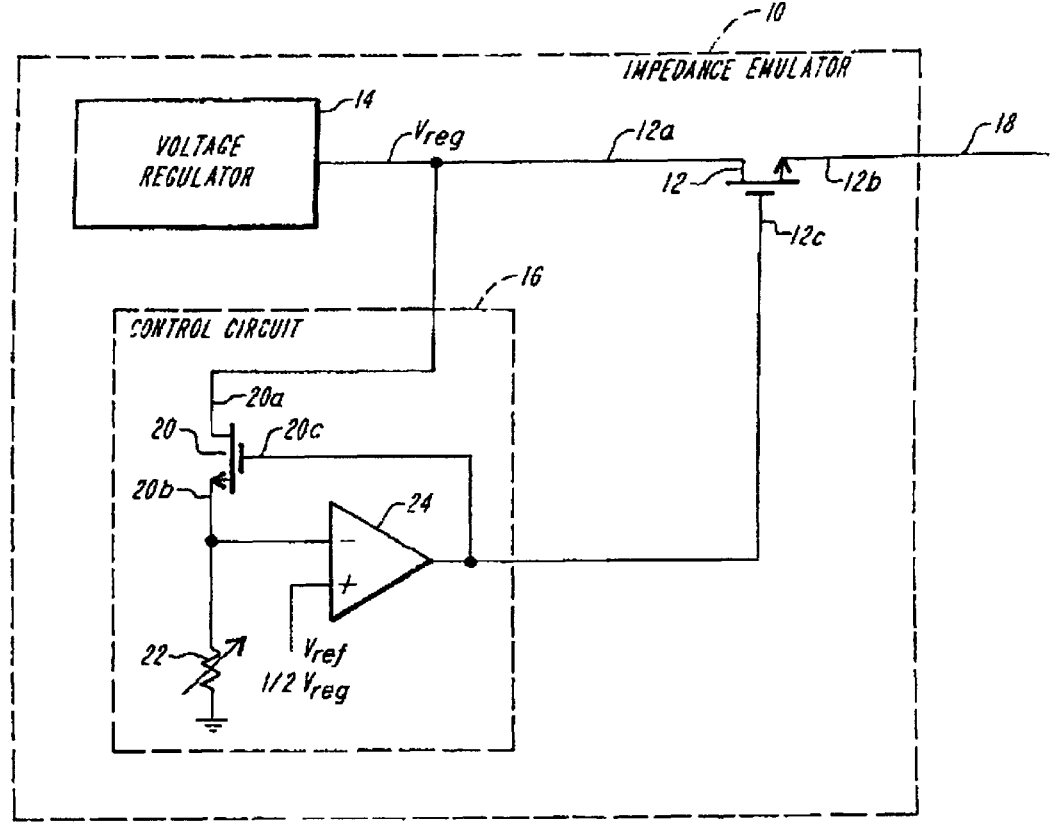

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECFICATION AFFECTED BY AMENDMENT ARE PRINTED HEREIN.

Column 1, lines 46–62:

In accordance with the invention, a low capacitance impedance emulator is provided for emulating a selected impedance having a substantially linear characteristic. The emulator is well suited for use in terminating one or more conductors of a high-speed data bus where accurate, low capacitance termination is critical. [the] *The* low capacitance of the emulator ensures that when the terminator is coupled to the bus in a disconnect mode, the emulator does not adversely affect the conductor impedance. The impedance emulator utilizes an emulating FET operated in the linear region. The linear operation of the emulating FET provides an impedance across the drain and source electrodes of the FET which is substantially resistive (i.e., characterized by a linear relationship between the current through the FET and the voltage across the FET). This resistive characteristic is particularly effective in signal termination to reduce unwanted signal reflections.

Column 5, lines 61–67:

[AS] *As* noted above, with sufficient gate voltage, the second order effect on the relationship between the impedances of the emulating FET 12 and the control FET 20, such as is caused by variations in the voltage at the source electrode 12b of the emulating FET 12, is minimized. More particularly, the drain to source resistance of emulating FET 12 is given as follows:

Column 10, lines 48–60:

The disconnect/impedance selection circuit 134 is responsive to a single control signal 164 for providing the control signals 172, 174. To accomplish this operation, the disconnect/impedance selection circuit 134 is responsive both to the logic state and to the impedance of the disconnect/impedance selection control signal 164. That is, if the control signal [164:] *164* is applied directly to pin 150 (i.e., at a terminal 180), then a first relatively low control signal impedance is presented to the pin 150; whereas, if the control signal 164 is applied to pin 150 through a series resistor 184 (i.e., at a terminal 182), a second higher control signal impedance is presented. In one embodiment, resistor 184 has a value between 80KΩ and 150KΩ.

Column 14, line 62 through Column 15, line 10:

Referring also to FIG. 9, a plan view of an NMOS FET 250 well suited for use as an emulating FET in the circuits described above, such FETs 238 a-n, 240 a-n in FIG. 8, is shown. The NMOS FET 250 includes features which optimize the performance of the device in response to an ESD event, as will be described. NMOS FET 250 includes a centrally positioned source region 254, over which a plurality of source contacts 258 are disposed in electrical connection to the source region 254. A substantially annular-shaped gate [regions] *region* 262 is concentrically positioned around the source region 254 and a substantially annular-shaped draing region 266 is positioned concentrically around the gate region 262 with drain contracts 270 positioned thereover in electrical connection to the drain region 266, as shown. In the illustrative embodiment, the gate and drain regions 262, 266 are lmore specifically oval-shaped.

Column 15, lines 55–67:

As is apparent from the cross-sectional view of FIG. 10, regions 300, 304 (which provide the source and drain contacts 258, 270 of FIG. 9, respectively), are spaced from regions 296, 298 (which provide the gate region 262 in FIG. 9). The use of substantially annular-shaped gate and drain regions 262, 266, as well as the spacing of the source and drain contacts 258, 270 from the gate diffusion region 262, serve to increase the uniformity of current and electric field distribution in response to an ESD event. Thus, use of the NMOS FET of FIG. 9 in the impedance emulator/terminator embodiments discussed above advantageously reduces the likelihood of an ESD [event:] *event* catastrophically damaging the device and related circuitry.

AS A RESULT OF REEXAMINATION, IT HAS BEEN DETERMINED THAT:

Claims 1–5, 9, 12–14, 17–18, 21, 24–26, 29–30 and 33 are determined to be patentable as amended.

Claims 6–8, 10–11, 15–16, 19–20, 22–23, 27–28 and 31–32, dependent on an amended claim, are determined to be patentable.

1. A bus terminator for terminating a conductor of a bus having an impedance associated therewith comprising:
   a voltage regulator providing a regulated voltage;
   an emulating *field-effect transistor* (FET) having a [first] *gate* electrode, a [second] *drain* electrode, and a [third] *source* electrode, said [second] *drain* and [third] *source* electrodes adapted for being coupled in series between said voltage regulator and said conductor; and
   a control circuit coupled to said [first] *gate* electode of said emulating FET for maintaining said emulating FET in a linear region of operation so as to provide a substantially fixed resistive impedance to said conductor, said substantially fixed resistive impedance substantially matching said impedance of said conductor.

2. The terminator recited in claim 1 wherein said emulating FET is an *N-channel metal-oxide-semiconductor* (NMOS) device [and wherein said first electrode is a gate electrode, said second electrode is a drain electrode coupled to said voltage regulator, and said third electrode is a source electrode adapted for coupling to said conductor].

3. The terminator recited in claim [2] *1*, wherein said gate electode of said [NMOS device] *emulating FET* comprises a gate region and a gate contact, said source electrode of said [NMOS device] *emulating FET* comprises a source [regions] *region* and a source contact and said drain electrode of said [NMOS device] *emulating FET* comprises a drain region and a drain contact and wherein said source region is centrally located and surrounded by a substantially annular gate region and a [:substantially] *substantially* annular drain region.

4. The terminator recited in claim 1 further comprising a plurality of emulating FETs, each one adapted for coupling in series between said voltage regulator and said conductor and wherein said control circuit is coupled to said [first] *gate* electode of a selected one of said plurality of emulating FETs.

5. A bus terminator for terminating a conductor of a bus having an impedance associated therewith comprising:

a voltage regulator providing a regulated voltage;

an emulating *field-effect transistor* (FET) having a [first] *gate* electrode, a [second] *drain* electrode, and a [third] *source* electrode, said [second] *drain* and [third] *source* electrodes adapted for being coupled in series between said voltage regulator and said conductor; and a control circuit coupled to said [first] *gate* electrode of said emulating FET for maintaining said emulating FET in a linear region of operation so as to provide a resistive impedance to said conductor, said resistive impedance substantially matching said impedance of said conductor, said control circuit comprising:

(a) a control FET having a gate electrode, a source electrode, and a drain electrode;

(b) a variable resistor having an adjustable resistance value associated therewith and coupled in series with said control FET; and (c) an amplifier providing an output signal coupled to said gate electrode of [a] *said* control FET and said gate electrode of said emulating FET, said output signal causing said control FET and said emulating FET to provide and impedance having a predetermined relationship with respect to said resistance value of said resistor.

9. A circuit for providing an emulated impedance for terminating a conductor having an impedance associated therewith comprising:

a voltage source;

an emulating *field-effect transistor* (FET) coupled to said voltage source and having a gate electrode, a source electrode, and a drain electrode, wherein said emulating FET has said emulated impedance between said drain and source electrodes, said emulated impedance subtantially matching said impedance of said conductor; and a control circuit coupled to said gate electrode of said emulating FET for providing a control signal to maintain said emulating FET in a linear region of operation, said control circuit comprising a variable resistor having an adjustable resistance value, wherein said control signal causes said emulating FET to provide an impedance proportional to said resistance value and adjustable in accordance with said variable resistance value, said emulated impedance between said drain and source electrodes being substantially fixed at said impedance proportional to said resistance value.

12. The circuit recited in claim 9 wherein said emulating FET is an *N-channel metal-oxide-semiconductor* (NMOS) device.

13. The circuit recited in claim 9 wherein said emulating FET [is an NMOS device comprising] *comprises* a source region, a substantially annular shaped gate region disposed around said source region, and a substantially annular drain region disposed around said gate region.

14. A terminator for terminating a conductor having an impedance associated therewith comprising:

a voltage source having a voltage level associated therewith;

a plurality of emulating *field-effect transistors* (FETs), each having a [first] *gate* electrode, a [second] *drain* electrode, and a [third] *source* electrode, said [second] *drain* and [third] *source* electrodes of each of said plurality of emulating FETs adapted for being coupled in series between said voltage source and said conductor; and a control circuit coupled to said [first] *gate* electrode of a selected one of said plurality of emulating FETs for maintaining said selected emulating FET in a linear region of operation so as to provide a substantially fixed impedance to said conductor corresponding to said selected emulating FET, said substantially fixed impedance substantially matching said impedance of said conductor.

17. The terminator according to claim 14, wherein said control circuit further comprises an amplifier [arid] *and* a control FET coupled in a feedback relationship to said amplifier.

18. The terminator according to claim 17, wherein said control FET includes a gate electrode, a sourcd electrode, and a drain electrode and, said amplifier includes a pair of inputs and an output, wherein said amplifier output is coupled to said [first] *gate* of a selected one of said plurality of emulating FETs and to said control FET gate electrode and said control FET source electrode is coupled to a first of said pair of inputs and said control FET drain electrode is coupled to said voltage source.

21. A terminator for terminating a conductor having an impedance associated therewith comprising:

a voltage source having a voltage level associate therewith;

an emulating *field-effect transistor* (FET) having a gate electrode, a source electrode, and a drain electrode, said source and drain electrodes adapted for being coupled in series between said voltage source and said conductor;

a control circuit for maintaining said emulating FET in a linear region of operation so as to provide a substantially fixed impedance [of] *to* said conductor, said substantially fixed impedance substantially matching said impedance of said conductor; and a disconnect switch coupled to said gate electrode of said emulating FET for turning off said emulating FET in response to a disconnect signal provided to said terminator.

24. The terminator according to claim 23, wherein said control FET includes a [first] *gate* electrode, a [second] *drain* electrode, and a [third] *source* electrode, and [,] said amplifier includes a pair of inputs and an output, *and* wherein said amplifier output is coupled to said gate electrode of a selected one of said plurality or emulating FETs and to *said gate electrode of* said control FET [first electrode], [and] *said source electrode of* said control FET [second electrode] is coupled to a first of said pair of inputs *of said amplifier,* and *said drain electrode of* said control FET [third electrode] is coupled to said voltage source.

25. A terminator for terminating a conductor comprising:

a voltage source having a voltage level associated therewith;

an emulating *field-effect transistor* (FET) having a electrode, a source electrode, and a drain electrode, said surce and drain electrodes adapted for being coupled in series between said voltage source and said conductor;

a control circuit for maintaining said emulating FET in a linear region of operation so as to provide a termination impedance to said conductor; and a disconnect switch coupled to said gate electrode of said emulating FET for turning off said emulating FET in response to a disconnect signal provided to said terminator;

wherein said voltage source is responsive to said disconnect signal for entering a low power mode of operation.

26. A circuit for terminating a conductor, said circuit comprising:
   (a) a voltage regulator providing a regulated voltage;
   (b) a first emulating *field-effect transistor* (FET) having a gate electrode, a source electrode, and a drain electrode, said drain and source electrodes being adapted for coupling in series between said voltage regulator and said conductor;
   (c) a second emulating FET having a gate electrode, a source electrode, and a drain electrode, said drain and source electrodes adapted for coupling in series between said voltage regulator and said conductor;
   (d) a control circuit providing a control signal to maintain a selected one of said first and second emulating FETs in a linear region of operation, said control circuit comprising:
      (i) a control FET having a gate electrode, a source electrode, and a drain electrode, *said drain electrode being* coupled to said voltage regulator;
      (ii) a resistor coupled to said control FET; and
      (iii) an amplifier having a pair of input terminals and an output terminal, a first one of said pair of input terminals receiving a reference voltage, a second one of said pair of input terminals being coupled to said resistor, and said output terminal being coupled to said gate electrode *of* said circuit FET;
   (e) a first switch network connected between said output of said amplifier and said gate electrode of said first emulating FET, said first switch newtork adapted for connecting said gate electrode of said first emulating FET to ground or to said output of said amplifier in response to a first switch control signal;
   (f) a second switch network connected between said output of said amplifier and said gate electrode of said second emulating FET, said second switch network adapted for connecting said gate electrode of said second emulating FET to ground or to said output of said amplifier in response to a second switch control signal; and
   (g) a disconnect/impedance selection circuit for generating said first and second switch control signals in response to a single user provider signal.

29. A terminator for terminating a conductor having an impedance associated therewith comprising:
   a voltage source providing a reference voltage and a supply voltage;
   a plurality of emulating *field-effect transistors* (FET), each having a [first] *gate* electrode, a [second] *drain* electrode, and a [third] *source* electrode, said [second] *drain* and [third] *source* electrodes of each of said plurality of emulating FETs adapted for being coupled in series between said reference voltage and said conductor, said plurality of emulating FETs each having a predetermined impedance;
   a control circuit including an amplifier and a control FET coupled in a feedback relationship to said amplifier, said amplifier coupled to said [first] *gate* electrode of a selected one of said plurality of emulating FETs for maintaining said selected emulating FET in a linear region of operation to present said predetermined impedance to said conductor corresponding to said selected emulating FET, said predetermined impedance substantially matching said impedance of said conductor;
   a disconnect switch for selectively disconnecting said plurality of emulating FETs from said conductor; and
   a disconnect/impedance selection circuit adapted for being coupled to said disconnect switch and responsive to a [said] single [user provided] *user-provided* signal controlling said disconnect/impedance to selection circuit, wherein a first one of said plurality of emulating FETs is active presenting a first predetermined impedance to said conductor when said single [user provided] *user-provided* signal is in a first logic state having a first control impedance, and a second one of said plurality of emulating FETs is active presenting a second predetermined impedance to said conductor when said single [user provided] *user-provided* signal is in said first logic state having a second control impedance, and wherein said first and second ones of said plurality of emulating FETs are disconnected from said conductor when said single [user provided] *user-provided* signal is in a second logic state.

30. The terminator according to claim 29, wherein said disconnect/impedance selection circuit comprises:
   (a) a current mirror;
   (b) [a] first and second comparator circuit*s* coupled to said current mirror;
   (c) a disconnect logic circuit coupled to said first and second comparator circuit*s* for providing [a] first and second switch control signal*s*; and
   (d) an amplifier feedback circuit adapted for being coupled in series between said current mirror and said [user provided] *user-provided* control signal.

33. The terminator according to claim 30, wherein said first comparator circuit comprises:
   a first current source; and
   a first comparator having a pair of input terminals and an output terminal, a first of said pair of input terminals coupled to said current mirror and to said first current source, said output terminal coupled to said disconnect logic circuit, and a second of said pair of input terminals coupled to a comparator threshold voltage; *and wherein* said second comparator circuit [comprising] *comprises*:
   a second current source; and
   a second comparator having a pair of input terminals and an output terminal, a first of said pair of input terminals coupled to said current mirror and to said second current source, said output terminal coupled to said disconnect logic circuit, and a second of said pair of input terminals coupled to said comparator threshold voltage.

* * * * *